US011102770B2

(12) United States Patent
Chen

(10) Patent No.: US 11,102,770 B2
(45) Date of Patent: Aug. 24, 2021

(54) RESOURCE ALLOCATION METHOD, NETWORK DEVICE, AND TERMINAL DEVICE

(71) Applicant: HUAWEI TECHNOLOGIES CO., LTD., Guangdong (CN)

(72) Inventor: Zheng Chen, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 142 days.

(21) Appl. No.: 16/689,889

(22) Filed: Nov. 20, 2019

(65) Prior Publication Data

US 2020/0092864 A1    Mar. 19, 2020

Related U.S. Application Data

(63) Continuation of application No. PCT/CN2018/091646, filed on Jun. 15, 2018.

(30) Foreign Application Priority Data

Jun. 16, 2017  (CN) .......................... 201710459478.4

(51) Int. Cl.
  *H04W 72/04*   (2009.01)
(52) U.S. Cl.
  CPC ................. *H04W 72/042* (2013.01)
(58) Field of Classification Search
  CPC ... H04W 72/04; H04W 72/042; H04W 76/27; H04W 52/322; H04W 72/14; H04W 72/0216
  See application file for complete search history.

(56) References Cited

U.S. PATENT DOCUMENTS 10,448,423 B2 * 10/2019 Babaei ................. H04W 72/14
2011/0044239 A1   2/2011 Cai et al.
(Continued)

FOREIGN PATENT DOCUMENTS

CN     102823150 A    12/2012
CN     102823151 A    12/2012
(Continued)

OTHER PUBLICATIONS

R1-1706900 Huawei et al.,"On bandwidth part and bandwidth adaptation",3GPP TSG RAN WG1 Meeting #89, Hangzhou, China, May 15-19, 2017,total 9 pages.

(Continued)

*Primary Examiner* — Chi Ho A Lee

(74) *Attorney, Agent, or Firm* — Womble Bond Dickinson (US) LLP

(57) ABSTRACT

Disclosed are methods and systems for determining, by a terminal device, downlink control information that includes a first information field and a second information field. The first information field is used to indicate whether to switch an active bandwidth part of a terminal device. When the first information field indicates to switch the active bandwidth part of the terminal device, the second information field is used to indicate one or more active bandwidth parts and frequency domain resource location of a data channel in the active bandwidth parts to switch; or when the first information field indicates not to switch the active bandwidth part of the terminal device, the second information field is used to indicate a frequency domain resource location of a data channel in a currently accessed active bandwidth part. A working bandwidth part of the terminal device can be indicated, and resource utilisation is improved.

20 Claims, 14 Drawing Sheets

(56) References Cited

U.S. PATENT DOCUMENTS

| | | |
|---|---|---|
| 2011/0044261 A1 | 2/2011 | Cai et al. |
| 2013/0012186 A1 | 1/2013 | Kim et al. |
| 2014/0342747 A1 | 11/2014 | Lee et al. |
| 2016/0323865 A1 | 11/2016 | Kwon et al. |
| 2017/0111217 A1 | 4/2017 | Kim et al. |
| 2018/0098361 A1* | 4/2018 | Ji ............... H04L 5/0007 |
| 2018/0146439 A1* | 5/2018 | Kim ............. H04W 52/322 |
| 2018/0183551 A1* | 6/2018 | Chou ............ H04L 5/0042 |
| 2019/0223097 A1* | 7/2019 | Yi ............... H04W 52/0216 |
| 2020/0037260 A1* | 1/2020 | Fu ............... H04L 27/2646 |
| 2020/0077323 A1* | 3/2020 | Park ............. H04L 5/1469 |
| 2020/0092880 A1* | 3/2020 | Choi ............. H04L 5/1469 |
| 2020/0119895 A1* | 4/2020 | Choi ............. H04W 76/27 |
| 2020/0177342 A1* | 6/2020 | Pawar ............ H04L 5/0007 |
| 2020/0344034 A1* | 10/2020 | Moon ............. H04L 5/0094 |

FOREIGN PATENT DOCUMENTS

| | | |
|---|---|---|
| CN | 102934380 A | 2/2013 |
| CN | 104105161 A | 10/2014 |
| CN | 105991218 A | 10/2016 |
| WO | 2011053055 A2 | 5/2011 |

OTHER PUBLICATIONS

Huamei et al: "On bandwidth part and bandwidth adaptation",3GPP Draft; R1-1706900, May 6, 2017,total 10 pages.

Oppo et al: "MF on bandwidth part configuration",3GPP Draft; R1-1709265, May 17, 2017, total 6 pages.

Intel Corporation: "On DL and UL data scheduling",3GPP Draft; R1-1705032,Apr. 2, 2017, total 6 pages.

Samsung: "Flexible BW supports in NR",3GPP Draft; R2-1704501, May 14, 2017,total 6 pages.

* cited by examiner

RESOURCE ALLOCATION METHOD, NETWORK DEVICE, AND TERMINAL DEVICE

CROSS-REFERENCE TO RELATED APPLICATIONS

This application is a continuation of International Application No. PCT/CN2018/091646, filed on Jun. 15, 2018, which claims priority to Chinese Patent Application No. 201710459478.4, filed on Jun. 16, 2017, the disclosures of which are incorporated herein by reference in their entireties.

TECHNICAL FIELD

This application relates to the communications field, and more specifically, to a resource allocation method, a network device, and a terminal device.

BACKGROUND

In a fifth-generation radio access system standard, namely, New Radio (NR), a concept of a bandwidth part is introduced. A network device may configure one or more bandwidth parts for a terminal device. The bandwidth part includes a group of consecutive resource blocks (RB) in frequency domain. The network device may schedule a resource of a physical downlink shared channel (PDSCH) for the terminal device in the bandwidth part. A bandwidth value of a bandwidth part may be less than or equal to a maximum bandwidth that can be supported by the terminal device, and bandwidth parts may overlap in frequency domain.

In this way, the terminal device may work in different bandwidth parts. Therefore, a solution is urgently required to indicate a working bandwidth part of the terminal device.

SUMMARY

This application provides a resource allocation method, a network device, and a terminal device, to indicate a working bandwidth part of the terminal device, so that the network device and the terminal device can accurately exchange information, thereby improving resource utilisation.

According to a first aspect, a resource allocation method is provided. The method includes: determining, by a network device, downlink control information, where the downlink control information includes a first information field and a second information field, and the first information field is used to indicate whether an active bandwidth part of a terminal device needs to be switched, where when the first information field indicates that the active bandwidth part of the terminal device needs to be switched, the second information field is used to indicate one or more active bandwidth parts to which the terminal device needs to be handed over and a frequency domain resource location of a data channel in the one or more active bandwidth parts to which the terminal device needs to be handed over; or when the first information field indicates that the active bandwidth part of the terminal device does not need to be switched, the second information field is used to indicate a frequency domain resource location of a data channel in a currently accessed active bandwidth part; and sending, by the network device, the downlink control information.

The network device determines the downlink control information, where the downlink control information includes the first information field and the second information field; and sends the downlink control information to indicate a working frequency domain resource of the terminal device by using the first information field and the second information field, so that the network device and the terminal device can accurately exchange information, thereby improving resource utilization and communication efficiency.

In one embodiment, the first information field includes one bit.

When the bit is "1", it indicates that the active bandwidth part of the terminal device needs to be switched. When the bit is "0", it indicates that the active bandwidth part of the terminal device does not need to be switched. When the bit is "0", the second information field may be used to indicate the frequency domain resource location of the data channel in the currently accessed active bandwidth part. In comparison with a case in which a plurality of bits need to be added to indicate the active bandwidth part of the terminal device, in this embodiment of this application, overheads of downlink control information are reduced.

In one embodiment, the frequency domain resource location of the data channel may be a frequency domain resource of a downlink data channel, or may be a frequency domain resource of an uplink data channel.

In one embodiment, when the first information field indicates that the active bandwidth part of the terminal device needs to be switched, the second information field includes a first information subfield and a second information subfield; the first information subfield is used to indicate the one or more active bandwidth parts to which the terminal device needs to be handed over in one or more bandwidth parts, where the bandwidth part is less than or equal to bandwidth of the terminal device, the bandwidth of the terminal device includes a plurality of consecutive subbands in frequency domain, the bandwidth part includes a plurality of consecutive subbands in frequency domain in the bandwidth of the terminal device, and the subband includes a plurality of consecutive physical resource blocks (RBs) in frequency domain; the first information subfield is further used to indicate at least one subband on which a frequency domain resource of the data channel is located in the one or more active bandwidth parts to which the terminal device needs to be handed over; and the second information subfield is used to indicate a location of the frequency domain resource of the data channel in a physical resource block on the at least one subband.

When the first information field indicates that the active bandwidth part of the terminal device needs to be switched, the network device may divide the bandwidth of the terminal device into subbands, and indicate a subband of the frequency domain resource of the data channel and indicate a location of a resource block group of the data channel on the subband by using the second indication information field, thereby avoiding allocation of corresponding bits to resource block groups of frequency domain resources that do not need to be used to transmit the data channel, and reducing overheads of downlink control information.

In one embodiment, the first information subfield and the second information subfield may be represented in a bitmap form.

In one embodiment, before the determining, by a network device, downlink control information, the method further includes:

sending, by the network device, higher layer signaling to the terminal device, where the higher layer signaling is used to indicate a bandwidth value and/or a frequency domain resource location of each of the one or more bandwidth parts that are configured by the network device for the terminal device.

The network device may indicate, by using the higher layer signaling, the bandwidth value and/or the frequency domain resource location of each of the one or more bandwidth parts that are configured for the terminal device, so as to avoid always using the agreed one or more bandwidth parts, thereby improving flexibility.

In one embodiment, the first information subfield includes a plurality of bits, each of the plurality of bits corresponds to one subband in the bandwidth of the terminal device, and the method further includes: indicating, by using a location, in the first information subfield, of the first bit with a first bit value in the first information subfield and a location, in the first information subfield, of the last bit with the first bit value in the first information subfield, a frequency domain resource location of one of the active bandwidth parts to which the terminal device needs to be handed over; and/or indicating, by using a value of bandwidth between a subband corresponding to the first bit with the first bit value in the first information subfield and a subband corresponding to the last bit with the first bit value in the first information subfield, a bandwidth value of one of the active bandwidth parts to which the terminal device needs to be handed over.

The active bandwidth part to which the terminal device needs to be handed over is indicated in an "implicit" manner, and no dedicated resource needs to be configured for indication, thereby reducing resource overheads.

In one embodiment, the first information subfield includes a plurality of bits, each of the plurality of bits corresponds to one subband in the bandwidth of the terminal device, and a location, in the first information subfield, of each bit with the first bit value in the first information subfield is used to indicate frequency domain resource locations and/or bandwidth values of the one or more active bandwidth parts to which the terminal device needs to be handed over.

The active bandwidth part to which the terminal device needs to be handed over is indicated in another "implicit" manner, and no dedicated resource needs to be configured for indication, thereby reducing resource overheads.

In one embodiment, each bit with the first bit value in the first information subfield is further used to indicate a subband on which the frequency domain resource of the data channel is located in the one or more active bandwidth parts to which the terminal device needs to be handed over.

The first information subfield indicates the subband on which the frequency domain resource of the data channel is located. In this way, for subbands of frequency domain resources that do not need to be used to transmit the data channel, the network device does not need to configure resources to indicate locations of resource block groups in these subbands, thereby reducing resource overheads.

In one embodiment, the second information subfield includes a plurality of bits, each of the plurality of bits corresponds to each resource block group (RBG) in bandwidth including subbands corresponding to bits with the first bit value in the first information subfield, and the resource block group includes at least one consecutive physical resource block.

The network device indicates, by using values of the bits in the second information subfield, locations of resource block groups on a subband of a frequency domain resource used to transmit the data channel, so that the terminal device can determine locations of resource block groups used to transmit the data channel. This embodiment of this application provides an effective indication manner, thereby improving resource utilisation.

In one embodiment, the second information subfield is used to indicate one type of resource block group mapping mode in a resource block group mapping mode set, the resource block group mapping mode includes a granularity of the resource block group and a frequency domain resource location of the resource block group on a subband corresponding to each bit with the first bit value in the first information subfield, and the resource block group mapping mode set includes at least one type of resource block group mapping mode.

The network device indicates, by using the second information subfield, a resource block group mapping mode on a subband on which a frequency domain resource of the data channel exists, so that the terminal device can determine locations of resource block groups used to transmit the data channel. This embodiment of this application provides another effective indication manner, thereby improving resource utilization.

In one embodiment, before the determining, by a network device, downlink control information, the method further includes:

sending, by the network device, higher layer signaling to the terminal device, where the higher layer signaling is used to indicate the resource block group mapping mode set.

The network device indicates the resource block group mapping mode set by using the higher layer signaling, thereby improving flexibility of indicating a resource block group mapping mode on a subband of a frequency domain resource used to transmit the data channel.

In one embodiment, when the first information field indicates that the active bandwidth part of the terminal device does not need to be switched, the second information field includes a first information subfield and a second information subfield, the currently accessed active bandwidth part is less than or equal to bandwidth of the terminal device, the bandwidth of the terminal device includes a plurality of consecutive subbands in frequency domain, the bandwidth part includes a plurality of consecutive subbands in frequency domain in the bandwidth of the terminal device, and the subband includes a plurality of consecutive physical resource blocks RBs in frequency domain; the first information subfield is further used to indicate at least one subband on which a frequency domain resource of the data channel is located in the currently accessed active bandwidth part; and the second information subfield is used to indicate a location of the frequency domain resource of the data channel in a physical resource block on the at least one subband.

The terminal device may divide the bandwidth of the terminal device into subbands, and determine a subband of the frequency domain resource of the data channel in the currently accessed active bandwidth part and indicate a location of a resource block group of the data channel on the subband based on the second indication information field, thereby avoiding allocation of corresponding bits to resource block groups of frequency domain resources that do not need to be used to transmit the data channel, and reducing overheads of downlink control information.

In one embodiment, when the first information field indicates that the active bandwidth part of the terminal device needs to be switched, the second information field includes a first information subfield and a second information subfield, the first information subfield is used to indicate index numbers of the one or more active bandwidth parts to which the terminal device needs to be handed over in one or more bandwidth parts, the second information subfield is used to indicate a frequency domain resource location of a frequency domain resource of the data channel in the one or more active bandwidth parts to which the terminal device needs to be handed over, and the bandwidth part is less than or equal to bandwidth of the terminal device.

The network device indicates, by using the first information subfield, the index numbers of the one or more active bandwidth parts to which the terminal device needs to be handed over, thereby reducing resources occupied by indicating the one or more active bandwidth parts to which the terminal device needs to be handed over.

In one embodiment, before the determining, by a network device, downlink control information, the method further includes: sending, by the network device, higher layer signaling to the terminal device, where the higher layer signaling is used to indicate a frequency domain resource location and/or a bandwidth value, and an index number of each of the one or more bandwidth parts.

The network device indicates an index number of each of the one or more bandwidth parts in advance by using the higher layer signaling, thereby improving indication flexibility.

In one embodiment, bandwidth values of the subbands included in the bandwidth of the terminal device are the same.

When the bandwidth values of the subbands included in the bandwidth of the terminal device are the same, the terminal device may agree with the network device in advance on a bandwidth value of a subband or indicate the same bandwidth value, so as to avoid separately indicating specific bandwidth values of different subbands, thereby reducing resource overheads.

In one embodiment, before the sending, by the network device, the downlink control information, the method further includes:

preconfiguring, by the network device, a quantity of bits included in the second information field, where the quantity of bits included in the second information field is a fixed value; and sending, by the network device, higher layer signaling or a system message, where the higher layer signaling or the system message is used to indicate the quantity of bits included in the second information field; or determining, by the network device, a quantity of bits included in the second information field based on a bandwidth value of the bandwidth of the terminal device and a mapping relationship between different system bandwidth values and a quantity of resource blocks included in a resource block group.

When the first information field indicates that the active bandwidth part of the terminal device is not switched, and when the first information field indicates that the active bandwidth part of the terminal device is switched, the network device may configure that second information fields include a same quantity of bits. In this way, the terminal device may monitor only fixed-size downlink control information and does not need to perform blind detection based on a plurality of possible sizes of downlink control information, so that complexity of monitoring downlink control information by the terminal device is reduced.

In addition, the network device may configure resource occupation of the second information field by using the higher layer signaling, or may agree with the terminal device on resource occupation of the second information field in advance.

In one embodiment, the network device may further determine a size and a location of a radio frequency bandwidth part of the terminal device based on a bandwidth value and a location of an active bandwidth part, and then adjust a bandwidth of the radio frequency bandwidth part, so as to effectively reduce power consumption of the terminal device, balance a system load, and improve spectrum utilization.

According to a second aspect, a resource allocation method is provided. The method includes: receiving, by a terminal device, downlink control information, where the downlink control information includes a first information field and a second information field, and the first information field is used to indicate whether an active bandwidth part of the terminal device needs to be switched; and when the first information field indicates that the active bandwidth part of the terminal device needs to be switched, determining, by the terminal device based on the second information field, one or more active bandwidth parts to which the terminal device needs to be handed over and a frequency domain resource location of a data channel in the one or more active bandwidth parts to which the terminal device needs to be handed over; or when the first information field indicates that the active bandwidth part of the terminal device does not need to be switched, determining, by the terminal device, a frequency domain resource location of a data channel in a currently accessed active bandwidth part based on the second information field.

The terminal device receives the downlink control information, where the downlink control information includes the first information field and the second information field, so that the network device and the terminal device can accurately exchange information by using a frequency domain resource location that is indicated by the first information field and the second information field and at which the terminal device works, thereby improving resource utilization and communication efficiency.

In one embodiment, the first information field includes one bit.

When the bit is "1", it indicates that the active bandwidth part of the terminal device needs to be switched. When the bit is "0", it indicates that the active bandwidth part of the terminal device does not need to be switched. When the bit is "0", the second information field may be used to indicate the frequency domain resource location of the data channel in the currently accessed active bandwidth part. In comparison with a case in which a plurality of bits need to be added to indicate the active bandwidth part of the terminal device, in this embodiment of this application, overheads of downlink control information are reduced.

In one embodiment, the second information field includes a first information subfield and a second information subfield, and the determining, by the terminal device based on the second information field, one or more active bandwidth parts to which the terminal device needs to be handed over and a frequency domain resource location of a data channel in the active bandwidth parts to which the terminal device needs to be handed over includes: determining, by the terminal device from one or more bandwidth parts based on the first information subfield, the one or more active bandwidth parts to which the terminal device needs to be handed over, where the bandwidth part is less than or equal to bandwidth of the terminal device, the bandwidth of the terminal device includes a plurality of consecutive subbands in frequency domain, the bandwidth part includes a plurality of consecutive subbands in frequency domain in the bandwidth of the terminal device, and the subband includes a plurality of consecutive physical resource blocks (RBs) in frequency domain; determining, by the terminal device based on the first information subfield, at least one subband on which a frequency domain resource of the data channel is located in the one or more active bandwidth parts to which the terminal device needs to be handed over; and determining, by the terminal device, a location of the frequency domain resource of the data channel in a physical resource block on the at least one subband based on the second information subfield.

When the first information field indicates that the active bandwidth part of the terminal device needs to be switched, the terminal device may divide the bandwidth of the terminal device into subbands, and determine a subband of the frequency domain resource of the data channel and indicate a location of a resource block group of the data channel on the subband based on the second indication information field, thereby avoiding allocation of corresponding bits to resource block groups of frequency domain resources that do not need to be used to transmit the data channel, and reducing overheads of downlink control information.

In one embodiment, before the receiving, by a terminal device, downlink control information, the method further includes: receiving, by the terminal device, higher layer signaling; and determining, by the terminal device based on the higher layer signaling, a bandwidth value and/or a frequency domain resource location of each of the one or more bandwidth parts that are configured by the network device for the terminal device.

The terminal device may determine the bandwidth value and/or the frequency domain resource location of each of the one or more bandwidth parts by receiving the higher layer signaling, so that after the bandwidth value and/or the frequency domain resource location of the bandwidth part are/is changed, the terminal device still performs calculation based on original data. Therefore, accuracy of the bandwidth value and/or accuracy of the frequency domain resource location of each of the one or more bandwidth parts are/is improved.

In one embodiment, the first information subfield includes a plurality of bits, each of the plurality of bits corresponds to one subband in the bandwidth of the terminal device, and the determining, by the terminal device from one or more bandwidth parts based on the first information subfield, the active bandwidth part to which the terminal device needs to be handed over includes: determining, by the terminal device based on a location, in the first information subfield, of the first bit with a first bit value in the first information subfield and a location, in the first information subfield, of the last bit with the first bit value in the first information subfield, a frequency domain resource location of one of the active bandwidth parts to which the terminal device needs to be handed over; and/or determining, by the terminal device based on a value of bandwidth between a subband corresponding to the first bit with the first bit value in the first information subfield and a subband corresponding to the last bit with the first bit value in the first information subfield, a bandwidth value of one of the active bandwidth parts to which the terminal device needs to be handed over; and determining, by the terminal device from the one or more bandwidth parts based on the frequency domain resource location of the active bandwidth part to which the terminal device needs to be handed over and/or the bandwidth value of the active bandwidth part to which the terminal device needs to be handed over, the active bandwidth part to which the terminal device needs to be handed over.

The terminal device may determine, based on the location, in the first information subfield, of the first bit with the first bit value in the first information subfield and the location, in the first information subfield, of the last bit with the first bit value in the first information subfield, the frequency domain resource location of the active bandwidth part to which the terminal device needs to be handed over, namely, a start frequency domain location, a frequency domain location of a center frequency, or an end frequency domain location of the active bandwidth part to which the terminal device needs to be handed over. The terminal device may further determine, based on the value of the bandwidth between the subband corresponding to the first bit with the first bit value in the first information subfield and the subband corresponding to the last bit with the first bit value in the first information subfield, the bandwidth value of the active bandwidth part to which the terminal device needs to be handed over. In this way, the terminal device determines, based on the frequency domain location of the active bandwidth part to which the terminal device needs to be handed over and/or the bandwidth value of the active bandwidth part to which the terminal device needs to be handed over, the active bandwidth part to which the terminal device needs to be handed over. In other words, the terminal device determines, based on an "implicit" indication manner of the network device, the active bandwidth part to which the terminal device needs to be handed over, so that the network device does not need to configure dedicated resources for indication, and resource overheads are reduced.

In one embodiment, the terminal device determines, based on a location, in the first information subfield, of each bit with the first bit value in the first information subfield, frequency domain resource locations of the one or more active bandwidth parts to which the terminal device needs to be handed over and/or bandwidth values of the one or more active bandwidth parts to which the terminal device needs to be handed over.

The terminal device determines, based on another "implicit" indication manner of the network device, the active bandwidth part to which the terminal device needs to be handed over, so that the network device does not need to configure dedicated resources for indication, and resource overheads are reduced.

In one embodiment, the determining, by the terminal device based on the first information subfield, at least one subband on which a frequency domain resource of the data channel is located in the one or more active bandwidth parts to which the terminal device needs to be handed over includes: determining, by the terminal device based on each bit with the first bit value in the first information subfield, a subband on which the frequency domain resource of the data channel is located in the one or more active bandwidth parts to which the terminal device needs to be handed over.

The first information subfield indicates the subband on which the frequency domain resource of the data channel is located. In this way, for subbands of frequency domain resources that do not need to be used to transmit the data channel, the network device does not need to configure resources to indicate locations of resource block groups in these subbands, thereby reducing resource overheads.

In one embodiment, the second information subfield includes a plurality of bits, each of the plurality of bits corresponds to each resource block group (RBG) in bandwidth including subbands corresponding to bits with the first bit value in the first information subfield, the resource block group includes at least one consecutive physical resource block, and the determining, by the terminal device, a location of the frequency domain resource of the data channel in a physical resource block on the at least one subband based on the second information subfield includes: determining, by the terminal device, an RBG corresponding to a bit with the first bit value in the second information subfield as a location of a physical resource block of the data channel.

The terminal device determines, by using values of the bits in the second information subfield, locations of resource block groups on a subband on which a frequency domain resource of the data channel exists, so that locations of resource block groups used to transmit the data channel can be determined. This embodiment of this application provides an effective indication manner, thereby improving resource utilisation.

In one embodiment, the second information subfield is used to indicate one type of resource block group mapping mode in a resource block group mapping mode set, the resource block group mapping mode includes a granularity of the resource block group and a frequency domain resource location of the resource block group on a subband corresponding to each bit with the first bit value in the first information subfield, the resource block group mapping mode set includes at least one type of resource block group mapping mode, and the determining, by the terminal device, a location of the frequency domain resource of the data channel in a physical resource block on the at least one subband based on the second information subfield includes: determining, by the terminal device based on the second information subfield, a mapping manner of a resource block group on the subband corresponding to each bit with the first bit value in the first information subfield; and determining, by the terminal device based on the mapping manner of the resource block group on the subband corresponding to each bit with the first bit value in the first information subfield, the location of the frequency domain resource of the data channel in the physical resource block on the at least one subband.

The terminal device determines, by using the second information subfield, a resource block group mapping mode on a subband on which a frequency domain resource of the data channel exists, so that a location of a resource block group used to transmit the data channel can be determined. This embodiment of this application provides another effective indication manner, thereby improving resource utilisation.

In one embodiment, before the receiving, by a terminal device, downlink control information, the method further includes: receiving, by the terminal device, higher layer signaling; and determining, by the terminal device, the resource block group mapping mode set based on the higher layer signaling.

The terminal device determines the resource block group mapping mode set by using the higher layer signaling, thereby improving accuracy of determining a resource block group mapping mode on a subband on which a frequency domain resource of the data channel exists.

In one embodiment, the second information field includes a first information subfield and a second information subfield, the currently accessed active bandwidth part is less than or equal to bandwidth of the terminal device, the bandwidth of the terminal device includes a plurality of consecutive subbands in frequency domain, the bandwidth part includes a plurality of consecutive subbands in frequency domain in the bandwidth of the terminal device, the subband includes a plurality of consecutive physical resource blocks (RBs) in frequency domain, and the determining, by the terminal device, a frequency domain resource location of a data channel in a currently accessed active bandwidth part based on the second information field includes: determining, by the terminal device based on the first information subfield, at least one subband on which a frequency domain resource of the data channel is located in the currently accessed active bandwidth part; and determining, by the terminal device, a location of the frequency domain resource of the data channel in a physical resource block on the at least one subband based on the second information subfield.

The network device may divide the bandwidth of the terminal device into subbands, and indicate a subband of the frequency domain resource of the data channel in the currently accessed active bandwidth part and indicate a location of a resource block group of the data channel on the subband by using the second indication information field, thereby further reducing overheads of downlink control information.

In one embodiment, the second information field includes a first information subfield and a second information subfield, the first information subfield is used to indicate index numbers of the one or more active bandwidth parts to which the terminal device needs to be handed over in one or more bandwidth parts, and the determining, by the terminal device based on the second information field, one or more active bandwidth parts to which the terminal device needs to be handed over and a frequency domain resource location of a data channel in the one or more active bandwidth parts to which the terminal device needs to be handed over includes: determining, by the terminal device based on the index numbers of the one or more active bandwidth parts to which the terminal device needs to be handed over, the one or more active bandwidth parts to which the terminal device needs to be handed over in the one or more bandwidth parts, where the bandwidth part is less than or equal to bandwidth of the terminal device; and determining, by the terminal device based on the second information subfield, a frequency domain resource location of a frequency domain resource of the data channel in the one or more active bandwidth parts to which the terminal device needs to be handed over.

The terminal device determines, by using the first information subfield, the index numbers of the one or more active bandwidth parts to which the terminal device needs to be handed over, thereby reducing resources occupied by the terminal device to learn of the one or more active bandwidth parts to which the terminal device needs to be handed over.

In one embodiment, before the receiving, by a terminal device, downlink control information, the method further includes: receiving, by the terminal device, higher layer signaling; and determining, by the terminal device, a frequency domain resource location and/or a bandwidth value, and an index number of each of the one or more bandwidth parts based on the higher layer signaling.

By receiving an indication of the higher layer signaling, the terminal device can accurately determine the index number of each of the one or more bandwidth parts, thereby improving accuracy of determining the one or more bandwidth parts.

In one embodiment, bandwidth values of the subbands included in the bandwidth of the terminal device are the same.

When the bandwidth values of the subbands included in the bandwidth of the terminal device are the same, the terminal device may agree with the network device in advance on a bandwidth value of a subband or indicate the same bandwidth value, so as to avoid separately indicating specific bandwidth values of different subbands by the network device, thereby reducing resource overheads.

In one embodiment, before the receiving, by a terminal device, downlink control information, the method further includes: receiving, by the terminal device, higher layer signaling or a system message; and determining, by the terminal device based on the higher layer signaling or the system message, a quantity of bits included in the second information field, where the quantity of bits included in the second information field is a fixed value; or determining, by the terminal device, a quantity of bits included in the second information field based on a bandwidth value of the bandwidth of the terminal device and a mapping relationship between different system bandwidth values and a quantity of resource blocks included in a resource block group.

When the first information field indicates that the active bandwidth part of the terminal device is not switched, and when the first information field indicates that the active bandwidth part of the terminal device is switched, the network device may configure that second information fields include a same quantity of bits. In this way, the terminal device may monitor only fixed-size downlink control information and does not need to perform blind detection based on a plurality of possible sizes of downlink control information, thereby reducing complexity of monitoring downlink control information by the terminal device.

In one embodiment, the terminal device may receive a data channel or send a data channel at a frequency domain resource location allocated by using the resource allocation method in this application, so as to improve resource utilisation.

According to a third aspect, a resource allocation method is provided. The method includes: sending, by a network device, first downlink control information, where the first downlink control information includes a first information subfield, and the first information subfield indicates that a terminal device is handed over from a first active bandwidth part to a second active bandwidth part in one or more bandwidth parts; and sending, by the network device, second downlink control information of the second active bandwidth part, where the second downlink control information includes a second information subfield, and the second information subfield is used to indicate a frequency domain resource location of a data channel in the second active bandwidth part.

The network device indicates, by sending the first downlink control information, that the terminal device needs to be handed over from the first active bandwidth part to the second active bandwidth part in the one or more bandwidth parts, and sends the second downlink control information of the second active bandwidth part, where the second downlink control information is used to indicate the frequency domain resource location of the data channel in the second active bandwidth part. In other words, in this embodiment of this application, a frequency domain resource location of a data channel can be indicated in a scenario of switching an active bandwidth part, thereby improving resource utilisation.

In one embodiment, both the first active bandwidth part and the second active bandwidth part are less than bandwidth of the terminal device. The bandwidth of the terminal device includes a plurality of consecutive subbands in frequency domain. The first active bandwidth part includes a plurality of consecutive subbands in frequency domain in the bandwidth of the terminal device. The second active bandwidth part includes a plurality of consecutive subbands in frequency domain in the bandwidth of the terminal device. The first information subfield is further used to indicate at least one subband on which a frequency domain resource of the data channel is located in the second active bandwidth part. The second information subfield is used to indicate a location of the frequency domain resource of the data channel in a physical resource block on the at least one subband.

The network device may divide the bandwidth of the terminal device into subbands, and indicate the at least one subband of the frequency domain resource of the data channel and indicate a location of a resource block group of the data channel on the at least one subband by using the second information subfield, thereby avoiding allocation of corresponding bits to resource block groups of frequency domain resources that do not need to be used to transmit the data channel, and reducing overheads of downlink control information.

In one embodiment, before the sending, by a network device, first downlink control information, the method further includes:

sending, by the network device, higher layer signaling to the terminal device, where the higher layer signaling is used to indicate a bandwidth value and/or a frequency domain resource location of each of the one or more bandwidth parts that are configured by the network device for the terminal device.

The network device may indicate, by using the higher layer signaling, the bandwidth value and/or the frequency domain resource location of each of the one or more bandwidth parts that are configured for the terminal device, so as to avoid always using the agreed one or more bandwidth parts, thereby improving flexibility.

In one embodiment, the first information subfield includes a plurality of bits, each of the plurality of bits corresponds to one subband in the bandwidth of the terminal device, and a location, in the first information subfield, of the first bit with a first bit value in the first information subfield and a location, in the first information subfield, of the last bit with the first bit value in the first information subfield are used to indicate a frequency domain resource location of the second active bandwidth part, and/or a value of bandwidth between a subband corresponding to the first bit with the first bit value in the first information subfield and a subband corresponding to the last bit with the first bit value in the first information subfield indicates a bandwidth value of the second active bandwidth part.

The second active bandwidth part is indicated in an "implicit" manner, and no dedicated resource needs to be configured for indication, thereby reducing resource overheads.

In one embodiment, the network device may also indicate one or more bandwidth parts that include subbands corresponding to bits whose value is "1" as second active bandwidth parts.

The active bandwidth part to which the terminal device needs to be handed over is indicated in another "implicit" manner, and no dedicated resource needs to be configured for indication, thereby reducing resource overheads.

In one embodiment, each bit with the first bit value in the first information subfield is further used to indicate a subband on which the frequency domain resource of the data channel is located in the second active bandwidth part.

The first information subfield indicates the subband on which the frequency domain resource of the data channel is located. In this way, for subbands of frequency domain resources that do not need to be used to transmit the data channel, the network device does not need to configure resources to indicate locations of resource block groups in these subbands, thereby reducing resource overheads.

In one embodiment, the second information subfield includes a plurality of bits, each of the plurality of bits corresponds to each resource block group (RBG) in bandwidth including subbands corresponding to bits with the first bit value in the first information subfield, and the resource block group includes at least one consecutive physical resource block.

The network device indicates, by using values of the bits in the second information subfield, locations of resource block groups on a subband on which a frequency domain resource of the data channel exists, so that the terminal device can determine locations of resource block groups used to transmit the data channel. This embodiment of this application provides an effective indication manner, thereby improving resource utilisation.

In one embodiment, the second information subfield is used to indicate one type of resource block group mapping mode in a resource block group mapping mode set, the resource block group mapping mode includes a granularity of the resource block group and a frequency domain resource location of the resource block group on a subband corresponding to each bit with the first bit value in the first information subfield, and the resource block group mapping mode set includes at least one type of resource block group mapping mode.

The network device indicates, by using the second information subfield, a resource block group mapping mode on a subband on which a frequency domain resource of the data channel exists, so that the terminal device can determine locations of resource block groups used to transmit the data channel. This embodiment of this application provides another effective indication manner, thereby improving resource utilization.

In one embodiment, before the sending, by a network device, first downlink control information, the method further includes: sending, by the network device, higher layer signaling to the terminal device, where the higher layer signaling is used to indicate the resource block group mapping mode set.

The network device indicates the resource block group mapping mode set by using the higher layer signaling, thereby improving flexibility of indicating a resource block group mapping mode on a subband on which a frequency domain resource of the data channel exists.

In one embodiment, the first information subfield is used to indicate an index number of the second active bandwidth part.

The network device indicates, by using the first information subfield, index numbers of one or more active bandwidth parts to which the terminal device needs to be handed over, thereby reducing resources occupied by indicating the one or more active bandwidth parts to which the terminal device needs to be handed over.

In some possible implementations, before the sending, by a network device, first downlink control information, the method further includes: sending, by the network device, higher layer signaling to the terminal device, where the higher layer signaling is used to indicate a frequency domain resource location and/or a bandwidth value, and an index number of each of the one or more bandwidth parts.

The network device indicates an index number of each of the one or more bandwidth parts in advance by using the higher layer signaling, thereby improving indication flexibility.

In one embodiment, bandwidth values of the subbands included in the bandwidth of the terminal device are the same.

When the bandwidth values of the subbands included in the bandwidth of the terminal device are the same, the terminal device may agree with the network device in advance on a bandwidth value of a subband or indicate the same bandwidth value, so as to avoid separately indicating specific bandwidth values of different subbands, thereby reducing resource overheads.

According to a fourth aspect, a resource allocation method is provided. The method includes: receiving, by a terminal device, the first downlink control information, where the first downlink control information includes a first information subfield; determining, by the terminal device, a second active bandwidth part in one or more bandwidth parts based on the first information subfield; being handed over, by the terminal device, from a first active bandwidth part to the second active bandwidth part; receiving, by the terminal device, second downlink control information in the second active bandwidth part, where the second downlink control information includes a second information subfield; and determining, by the terminal device, a frequency domain resource location of a data channel in the second active bandwidth part based on the second information subfield.

The terminal device receives the first downlink control information. The first downlink control information includes the first information subfield. The terminal device determines the second active bandwidth part in the one or more bandwidth parts based on the first information subfield, is handed from the first active bandwidth part to the second active bandwidth part, and receives the second downlink control information of the second active bandwidth part after being handed over to the second active bandwidth part, where the second downlink control information includes the second information subfield; and determines the frequency domain resource location of the data channel in the second active bandwidth part based on the second information subfield. In other words, in this embodiment of this application, a frequency domain resource location of a data channel can be determined based on an indication of downlink control information in a scenario of switching an active bandwidth part, thereby improving resource utilisation.

In one embodiment, both the first active bandwidth part and the second active bandwidth part are less than bandwidth of the terminal device. The bandwidth of the terminal device includes a plurality of consecutive subbands in frequency domain. The first active bandwidth part includes a plurality of consecutive subbands in frequency domain in the bandwidth of the terminal device. The second active bandwidth part includes a plurality of consecutive subbands in frequency domain in the bandwidth of the terminal device. The method further includes: determining, by the terminal device based on the first information subfield, at least one subband on which a frequency domain resource of the data channel is located in the second active bandwidth part; and the determining a frequency domain resource location of a data channel in the second active bandwidth part based on the second information subfield includes: determining, by the terminal device, a location of the frequency domain resource of the data channel in a physical resource block on the at least one subband based on the second information subfield.

The terminal device may divide the bandwidth of the terminal device into subbands, and determine a subband of the frequency domain resource of the data channel and indicate a location of a resource block group of the data channel on the subband based on the second indication information field, thereby avoiding allocation of corresponding bits to resource block groups of frequency domain resources that do not need to be used to transmit the data channel, and reducing overheads of downlink control information.

In one embodiment, before the receiving, by a terminal device, the first downlink control information, the method further includes: receiving, by the terminal device, higher layer signaling; and determining, by the terminal device based on the higher layer signaling, a bandwidth value and/or a frequency domain resource location of each of the one or more bandwidth parts that are configured by the network device for the terminal device.

The terminal device may determine the bandwidth value and/or the frequency domain resource location of each of the one or more bandwidth parts by receiving the higher layer signaling, so that after the bandwidth value and/or the frequency domain resource location of the bandwidth part are/is changed, the terminal device still performs calculation based on original data. Therefore, accuracy of the bandwidth value and/or accuracy of the frequency domain resource location of each of the one or more bandwidth parts are/is improved.

In one embodiment, the first information subfield includes a plurality of bits, each of the plurality of bits corresponds to one subband in the bandwidth of the terminal device, and the determining, by the terminal device, a second active bandwidth part in one or more bandwidth parts based on the first information subfield includes: determining a frequency domain resource location of the second active bandwidth part based on a location, in the first information subfield, of the first bit with a first bit value in the first information subfield and a location, in the first information subfield, of the last bit with the first bit value in the first information subfield; and/or determining, by the terminal device, a bandwidth value of the second active bandwidth part based on a value of bandwidth between a subband corresponding to the first bit with the first bit value in the first information subfield and a subband corresponding to the last bit with the first bit value in the first information subfield; and determining, by the terminal device, the second active bandwidth part in the one or more bandwidth parts based on the frequency domain resource location of the second active bandwidth part and/or the bandwidth value of the second active bandwidth part.

The terminal device determines, based on an "implicit" indication manner of the network device, the active bandwidth part to which the terminal device needs to be handed over, so that the network device does not need to configure dedicated resources for indication, and resource overheads are reduced.

In one embodiment, the terminal device may also determine one or more bandwidth parts that include subbands corresponding to bits whose value is "1" as active bandwidth parts to which the terminal device needs to be handed over.

The terminal device determines, based on another "implicit" indication manner of the network device, the active bandwidth part to which the terminal device needs to be handed over, so that the network device does not need to configure dedicated resources for indication, and resource overheads are reduced.

In one embodiment, the determining, by the terminal device based on the first information subfield, at least one subband on which a frequency domain resource of the data channel is located in the second active bandwidth part includes: determining, by the terminal device based on each bit with the first bit value in the first information subfield, a subband on which the frequency domain resource of the data channel is located in the second active bandwidth part.

The first information subfield indicates the subband on which the frequency domain resource of the data channel is located. In this way, for subbands of frequency domain resources that do not need to be used to transmit the data channel, the network device does not need to configure resources to indicate locations of resource block groups in these subbands, thereby reducing resource overheads.

In one embodiment, the second information subfield includes a plurality of bits, each of the plurality of bits corresponds to each resource block group (RBG) in bandwidth including subbands corresponding to bits with the first bit value in the first information subfield, the resource block group includes at least one consecutive physical resource block, and the determining, by the terminal device, a location of the frequency domain resource of the data channel in a physical resource block on the at least one subband based on the second information subfield includes: determining, by the terminal device, an RBG corresponding to a bit with the first bit value in the second information subfield as a location of a physical resource block of the data channel.

The terminal device determines, by using values of the bits in the second information subfield, locations of resource block groups on a subband on which a frequency domain resource of the data channel exists, so that locations of resource block groups used to transmit the data channel can be determined. This embodiment of this application provides an effective indication manner, thereby improving resource utilisation.

In one embodiment, the second information subfield is used to indicate one type of resource block group mapping mode in a resource block group mapping mode set, the resource block group mapping mode includes a granularity of the resource block group and a frequency domain resource location of the resource block group on a subband corresponding to each bit with the first bit value in the first information subfield, the resource block group mapping mode set includes at least one type of resource block group mapping mode, and the determining, by the terminal device, a location of the frequency domain resource of the data channel in a physical resource block on the at least one subband based on the second information subfield includes: determining, by the terminal device based on the second information subfield, a mapping manner of a resource block group on the subband corresponding to each bit with the first bit value in the first information subfield; and determining, by the terminal device based on the mapping manner of the resource block group on the subband corresponding to each bit with the first bit value in the first information subfield, the location of the frequency domain resource of the data channel in the physical resource block on the at least one subband.

The terminal device determines, by using the second information subfield, a resource block group mapping mode on a subband on which a frequency domain resource of the data channel exists, so that a location of a resource block group used to transmit the data channel can be determined. This embodiment of this application provides another effective indication manner, thereby improving resource utilisation.

In one embodiment, before the receiving, by a terminal device, the second downlink control information, the method further includes: receiving, by the terminal device, higher layer signaling; and determining, by the terminal device, the resource block group mapping mode set based on the higher layer signaling.

The terminal device determines the resource block group mapping mode set by using the higher layer signaling, thereby improving accuracy of determining a resource block group mapping mode on a subband on which a frequency domain resource of the data channel exists.

In one embodiment, the first information subfield is used to indicate an index number of the second active bandwidth part, and the determining, by the terminal device, a second active bandwidth part in one or more bandwidth parts based on the first information subfield includes: determining, by the terminal device, the second active bandwidth part in the one or more bandwidth parts based on the index number of the second active bandwidth part.

The terminal device determines, by using the first information subfield, index numbers of one or more active bandwidth parts to which the terminal device needs to be handed over, thereby reducing resources occupied by the terminal device to learn of the one or more active bandwidth parts to which the terminal device needs to be handed over.

In some possible implementations, before the receiving, by a network device, the first downlink control information, the method further includes: receiving, by the terminal device, higher layer signaling; and determining, by the terminal device, a frequency domain resource location and/or a bandwidth value, and an index number of each of the one or more bandwidth parts based on the higher layer signaling.

By receiving a timely indication of the higher layer signaling, the terminal device can accurately determine the index number of each of the one or more bandwidth parts, thereby improving accuracy of determining the one or more bandwidth parts.

In one embodiment, bandwidth values of the subbands included in the bandwidth of the terminal device are the same.

When the bandwidth values of the subbands included in the bandwidth of the terminal device are the same, the terminal device may agree with the network device in advance on a bandwidth value of a subband or indicate the same bandwidth value, so as to avoid separately indicating specific bandwidth values of different subbands by the network device, thereby reducing resource overheads.

According to a fifth aspect, a network device is provided. The network device includes a module configured to perform the method in any one of the first aspect or the embodiments of the first aspect.

According to a sixth aspect, a terminal device is provided. The terminal device includes a module configured to perform the method in any one of the second aspect or the embodiments of the second aspect.

According to a seventh aspect, a system is provided. The system includes:
the network device according to the fifth aspect and the terminal device according to the sixth aspect.

According to an eighth aspect, a network device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in any one of the first aspect or the embodiments of the first aspect.

According to a ninth aspect, a terminal device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in any one of the second aspect or the embodiments of the second aspect.

According to a tenth aspect, a computer storage medium is provided. The computer storage medium stores program code, and the program code is used to indicate an instruction used to perform the method in any one of the first aspect or the embodiments of the first aspect.

According to an eleventh aspect, a computer storage medium is provided. The computer storage medium stores program code, and the program code is used to indicate an instruction used to perform the method in any one of the second aspect or the embodiments of the second aspect.

According to a twelfth aspect, a network device is provided. The network device includes a module configured to perform the method in any one of the third aspect or the embodiments of the third aspect.

According to a thirteenth aspect, a terminal device is provided. The terminal device includes a module configured to perform the method in any one of the fourth aspect or the embodiments of the fourth aspect.

According to a fourteenth aspect, a system is provided. The system includes:
the network device according to the twelfth aspect and the terminal device according to the thirteenth aspect.

According to a fifteenth aspect, a network device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in any one of the third aspect or the embodiments of the third aspect.

According to a sixteenth aspect, a terminal device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in any one of the fourth aspect or the embodiments of the fourth aspect.

According to a seventeenth aspect, a computer storage medium is provided. The computer storage medium stores program code, and the program code is used to indicate an instruction used to perform the method in any one of the first aspect or the embodiments of the first aspect.

According to an eighteenth aspect, a computer storage medium is provided. The computer storage medium stores program code, and the program code is used to indicate an instruction used to perform the method in any one of the fourth aspect or the embodiments of the fourth aspect.

According to a nineteenth aspect, a system chip is provided. The system chip includes an input/output interface, at least one processor, at least one memory, and a bus, the at least one memory is configured to store an instruction, and the at least one processor is configured to invoke the instruction of the at least one memory to perform operations of the methods in the foregoing aspects.

Based on the foregoing solutions, the network device determines the downlink control information, where the downlink control information includes the first information field and the second information field; and sends the downlink control information to indicate a working frequency domain resource of the terminal device by using the first information field and the second information field, so that the network device and the terminal device can accurately exchange information, thereby improving resource utilisation and communication efficiency.

DESCRIPTION OF EMBODIMENTS

The following describes technical solutions of this application with reference to accompanying drawings.

The technical solutions of the embodiments of this application may be applied to various communications systems, such as: a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio system.

The terminal device in the embodiments of this application may also be referred to as user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with a terminal device. The network device may be a base transceiver station (BTS) in a global system for mobile communications (GSM) or code division multiple access (CDMA), or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

Figure 1:
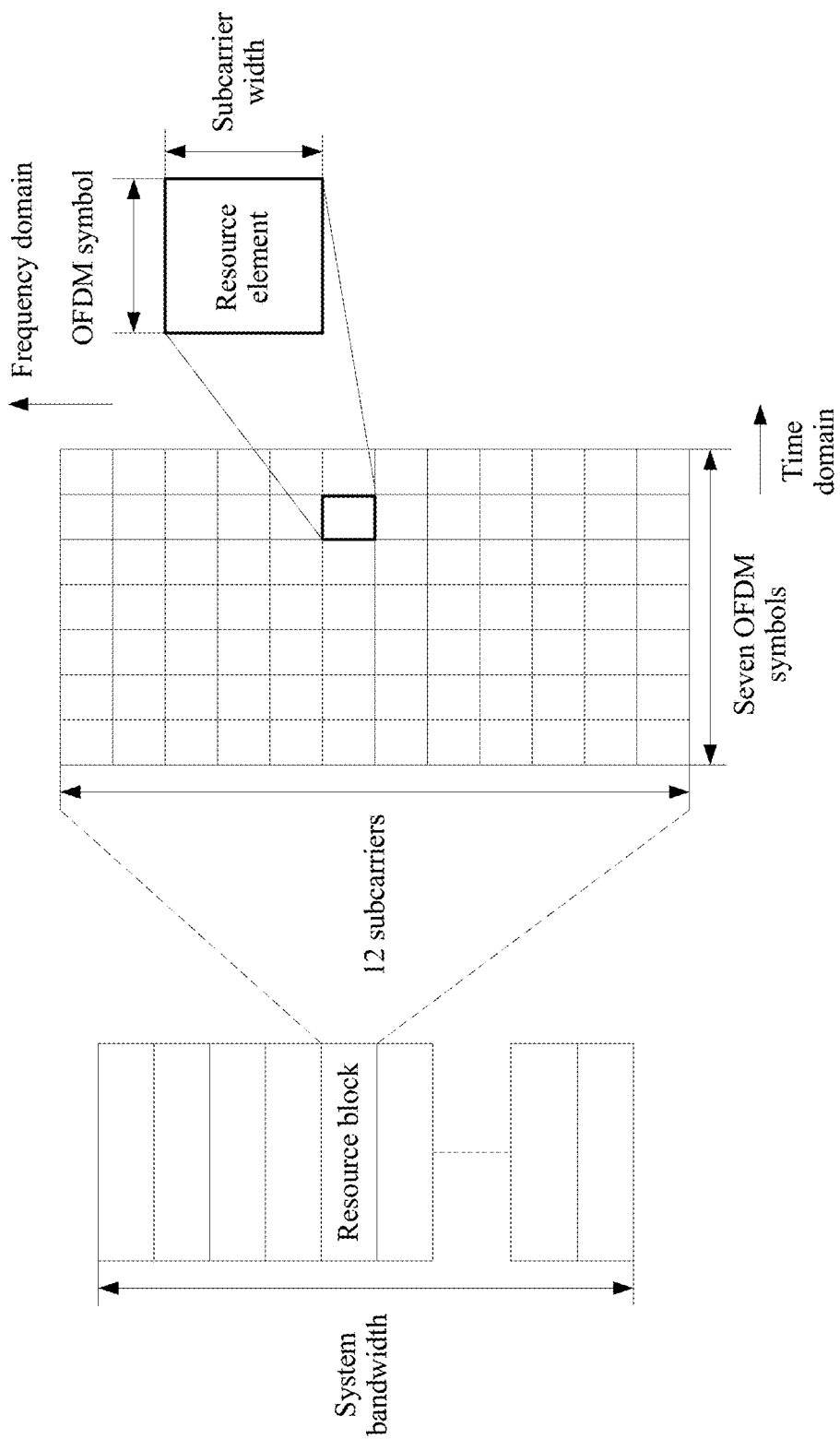
FIG. 1 is a schematic diagram of time-frequency resource division in NR.

FIG. 1 is a schematic diagram of time-frequency resource division in NR. As shown in FIG. 1, a time-frequency resource may be divided into a plurality of RBs, and each RB may be divided into a plurality of resource elements (RE). Each resource element occupies one orthogonal frequency division multiplexing (OFDM) symbol in time domain, and occupies one subcarrier in frequency domain. Each RB may include 12 consecutive subcarriers in frequency domain and six or seven consecutive OFDM symbols in time domain. A subcarrier spacing may be 15 KHz, 30 KHz, 60 KHz, or the like.

A basic time unit for downlink resource scheduling in NR is a slot (slot). One slot includes seven or 14 OFDM symbols that are connected in terms of time, and a slot may be divided into a control region and a data region. A PDSCH is transmitted in the data region of the slot, and is a downlink channel used for carrying data transmission in the slot. A slot time-frequency resource used by the PDSCH also includes RBs. To correctly receive the PDSCH, a terminal device needs to first demodulate a downlink control channel (PDCCH), and the PDCCH is transmitted in the control region of the slot. Downlink control information (DCI) carried in the PDCCH includes information that can indicate locations of RBs used by the PDSCH in frequency domain, namely, downlink resource allocation information.

In NR and LTE, a resource allocation information field exists in DCI, and is used to indicate an RB on which the terminal device receives a PDSCH. A quantity of bits occupied by the information field depends on a value of bandwidth allocated by a network device for transmitting the PDSCH and a resource allocation type.

In the LTE system, the resource allocation type includes three types: a type 0, a type 1, and a type 2. The network device determines the resource allocation type of the PDSCH based on a selected DCI format of a PDCCH and configuration of related bits in the DCI. The resource allocation type 0 is most likely to be introduced into an NR standard, and a frequency domain resource of the PDSCH is usually allocated based on system bandwidth.

In the resource allocation type 0, a resource allocation information field is a bitmap (bitmap), and the bitmap is used to indicate a location of a resource block group (RBG) allocated to a PDSCH, where the RBG includes a plurality of consecutive RBs in frequency domain, and a quantity of RBs included in each RBG is related to a downlink system bandwidth $N_{RB}^{DL}$, as shown in Table 1.

TABLE 1

| System bandwidth ($N_{RB}^{DL}$) | RBG size (P) |
|---|---|
| ≤10 | 1 |
| 11-26 | 2 |
| 27-63 | 3 |
| 64-110 | 4 |

If a system bandwidth is $N_{RB}^{DL}$, and an RBG size is P, a total quantity of RGBs is $\lceil N_{RB}^{DL}/P \rceil$, a corresponding bitmap includes $\lceil N_{RB}^{DL}/P \rceil$ bits, each bit corresponds to one RBG, a most significant bit represents an RBG 0, and a least significant bit represents an RBG $\lceil N_{RB}^{DL}/P \rceil-1$. If an RBG is allocated to the PDSCH, a corresponding bit value in the bitmap is 1. If an RBG is not allocated to the PDSCH, a corresponding bit value in the bitmap is 0.

Figure 2:
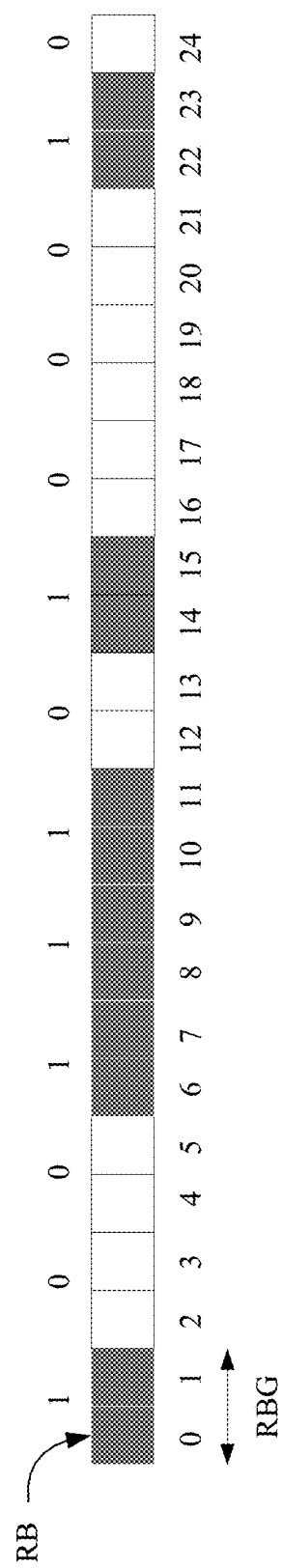
FIG. 2 is a schematic diagram of a resource allocation method in a conventional solution.

For example, as shown in FIG. 2, when a system bandwidth $N_{RB}^{DL}$=25 RBs, and it is learned from Table 1 that the RBG size P=2, the bitmap includes $\lceil N_{RB}^{DL}/P \rceil$=13 bits in total, and each bit represents two consecutive RBs in frequency domain corresponding to one RBG. It is assumed that a code of a bitmap of resources allocated to the PDSCH is 1001110100010. RBG resources numbered 0, 3, 4, 5, 7, and 11 are allocated to the PDSCH.

Figure 3:
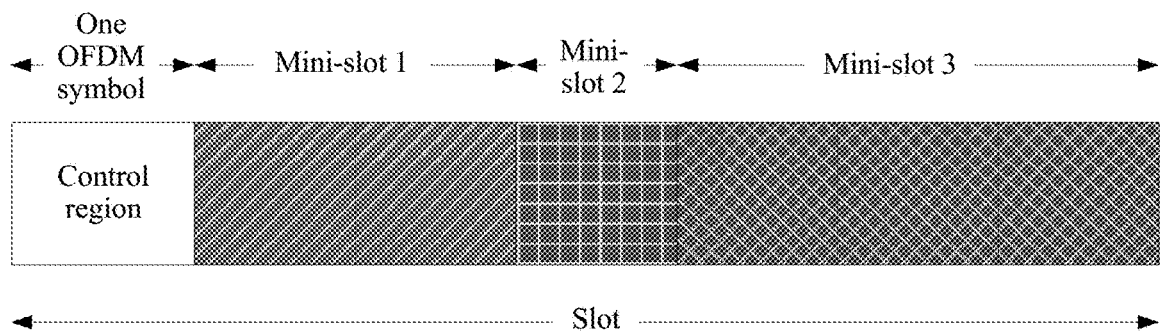
FIG. 3 is a schematic structural diagram of a slot (slot) and a mini-slot (mini-slot)

A concept of a mini-slot is introduced in NR. FIG. 3 is a schematic structural diagram of a slot and a mini-slot. The mini-slot may include several OFDM symbols. One or more mini-slots may be included in one slot, and a time domain length of the mini-slot may be from two OFDM symbols to n-1 OFDM symbols, where n is a quantity of OFDM symbols included in one slot. The mini-slot may be used to transmit a PDCCH or a PDSCH.

Figure 4:
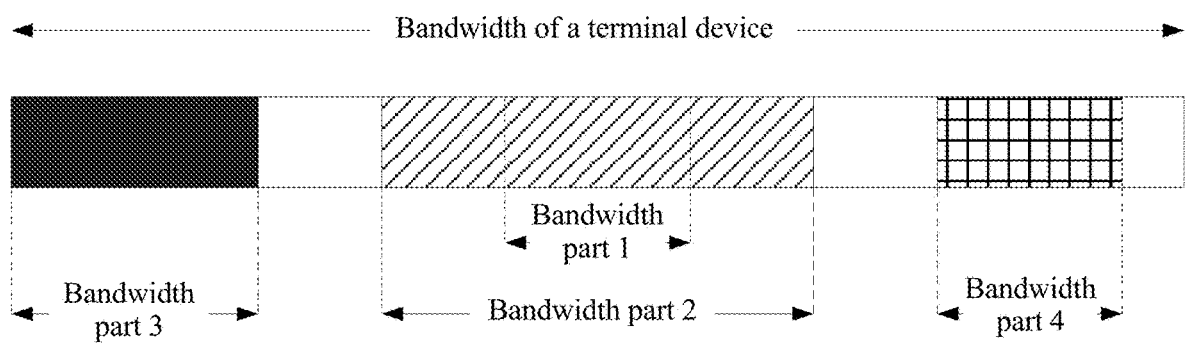
FIG. 4 is a schematic structural diagram of a bandwidth part and bandwidth of a terminal device.

In addition, a concept of a bandwidth part is further introduced in NR. FIG. 4 is a schematic structural diagram of a bandwidth part and bandwidth of the terminal device. The network device may configure one or more bandwidth parts for the terminal device. The bandwidth part includes a group of consecutive RB resources in frequency domain.

The network device may schedule a PDSCH resource for the terminal device in the bandwidth part. A bandwidth value of a bandwidth part may be less than or equal to a maximum bandwidth that can be supported by the terminal device, and bandwidth parts may overlap in frequency domain.

In NR, a frequency domain resource for transmitting a PDSCH may be allocated in a bandwidth part. The network device configures one or more bandwidth parts for the terminal device by using a semi-static configuration method. In addition, at a specific time, the network device needs to indicate an active bandwidth part to the terminal device by using DCI, and also indicate frequency domain resource allocation information in the active bandwidth part to the terminal device by using the DCI. The network device transmits a PDSCH and a PDCCH in the active bandwidth part, where the PDCCH carries scheduling information of the PDSCH, namely, allocation information of a resource used to transmit the PDSCH in the active bandwidth part.

In a conventional solution, a network device indicates an active bandwidth part to a terminal device by using a newly added information field in DCI, and also needs to indicate a frequency domain resource location of the active bandwidth part. To be specific, the newly added information field in the DCI indicates an RB on which the terminal device receives a PDSCH in the bandwidth part. Therefore, in the conventional solution, the network device needs to newly add an additional information field to the DCI, so as to indicate an active bandwidth part and a frequency domain resource location to the terminal device. Consequently, overheads of the DCI are increased.

Figure 5:
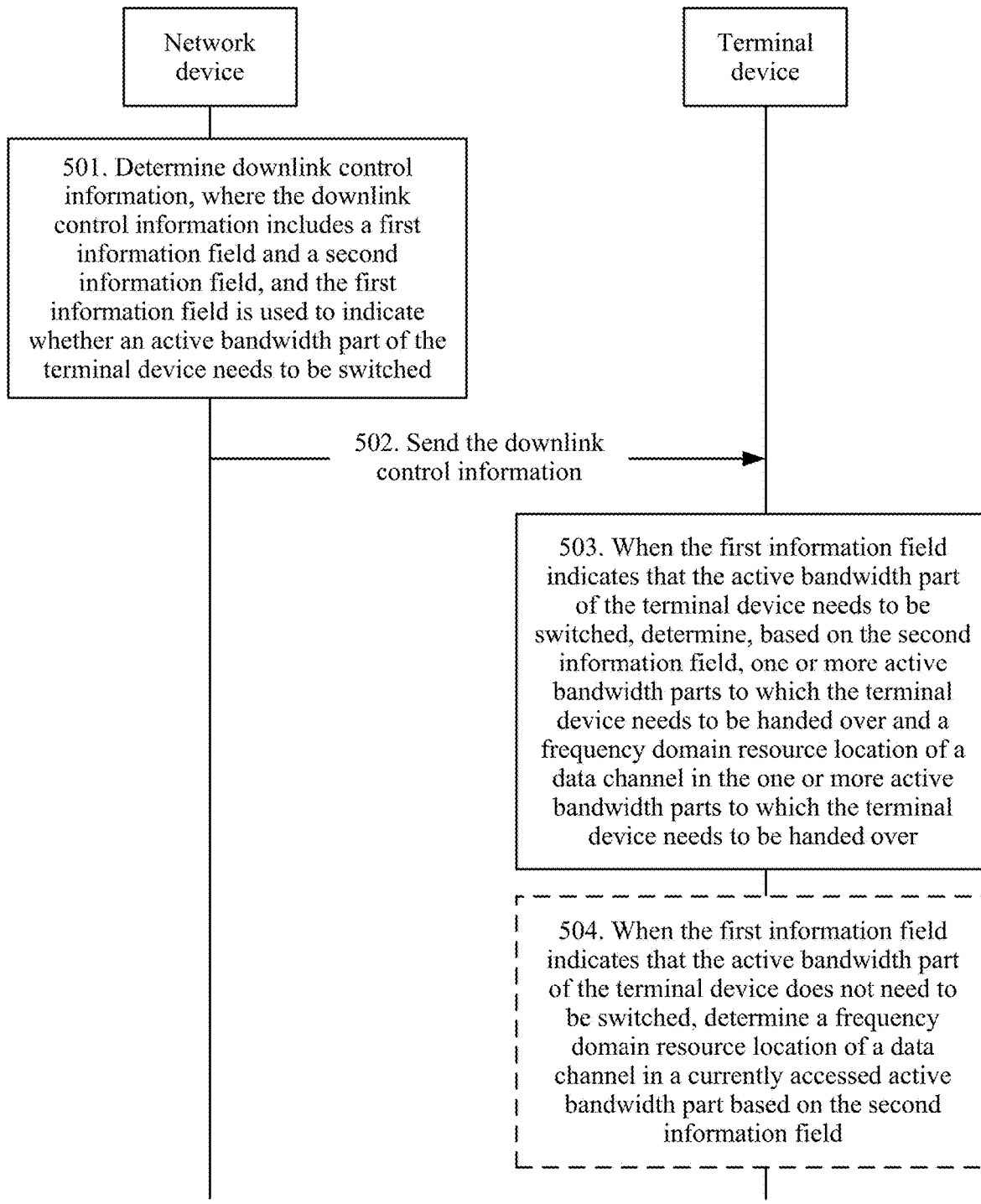
FIG. 5 is a schematic flowchart of a resource allocation method according to an embodiment of this application.

FIG. 5 is a schematic flowchart of a resource allocation method according to an embodiment of this application.

Operation 501. A network device determines downlink control information, where the downlink control information includes a first information field and a second information field, and the first information field is used to indicate whether an active bandwidth part of a terminal device needs to be switched, where when the first information field indicates that the active bandwidth part of the terminal device needs to be switched, the second information field is used to indicate one or more active bandwidth parts to which the terminal device needs to be handed over and a frequency domain resource location of a data channel in the active bandwidth parts to which the terminal device needs to be handed over; or when the first information field indicates that the active bandwidth part of the terminal device does not need to be switched, the second information field is used to indicate a frequency domain resource location of a data channel in a currently accessed active bandwidth part.

The first information field may be an information field newly added to downlink control information, or may be an information field reused to indicate other information. This is not limited in this application. The frequency domain resource location of the data channel may be a frequency domain resource of a downlink data channel, or may be a frequency domain resource of an uplink data channel.

In one embodiment, the first information field may include one bit. When the bit is "1", it indicates that the active bandwidth part of the terminal device needs to be switched. When the bit is "0", it indicates that the active bandwidth part of the terminal device does not need to be switched.

It should be understood that, alternatively, the bit being "0" may be used to indicate that the active bandwidth part of the terminal device needs to be switched, and the bit being "1" is used to indicate that the active bandwidth part of the terminal device does not need to be switched. This is not limited in this application. For ease of description, in the following embodiment, that the bit being "1" indicates that the active bandwidth part of the terminal device needs to be switched, and the bit being "0" indicates that the active bandwidth part of the terminal device does not need to be switched is used as an example for description.

In one embodiment, when the first information field indicates that the active bandwidth part of the terminal device needs to be switched, the second information field includes a first information subfield and a second information subfield, and the first information subfield is used to indicate the one or more active bandwidth parts to which the terminal device needs to be handed over in one or more bandwidth parts.

In addition, in this application document, a concept of a subband in a bandwidth part is introduced. Bandwidth of the terminal device may be divided into a plurality of subbands, to be specific, the bandwidth of the terminal device includes a plurality of consecutive subbands in frequency domain, and each subband includes a plurality of consecutive physical resource blocks RBs or RBGs in frequency domain.

Figure 6:
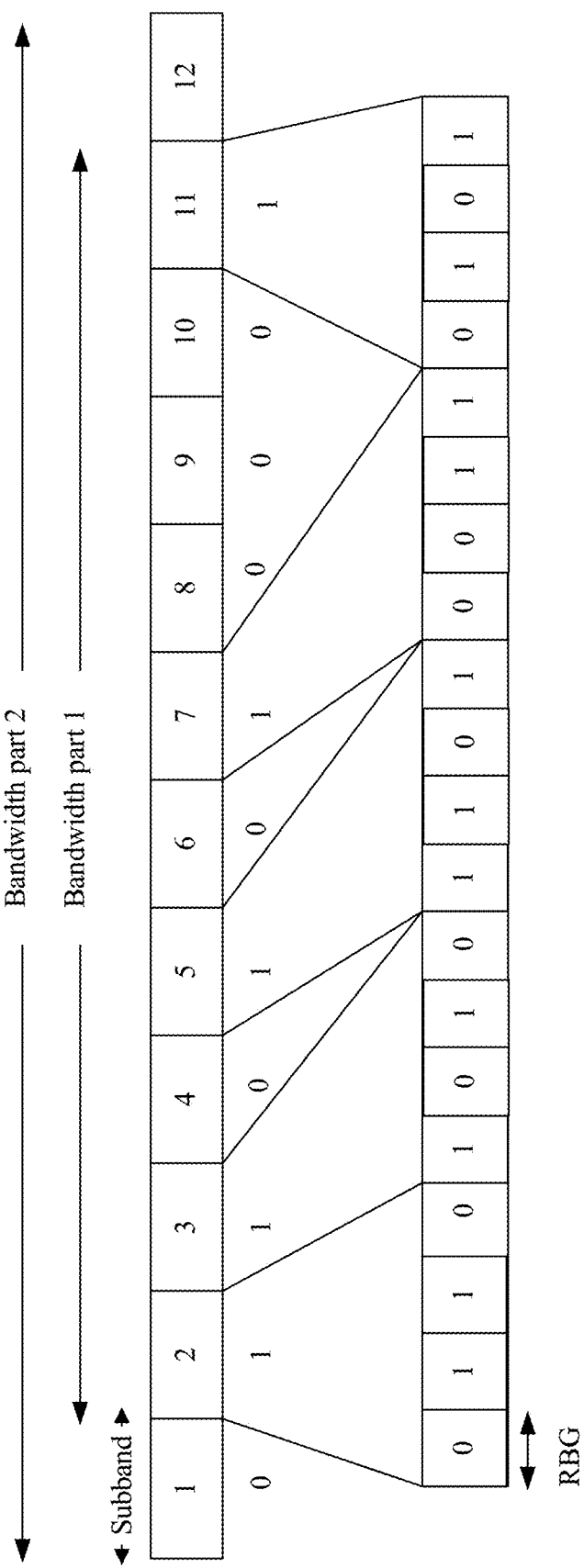
FIG. 6 is a schematic structural diagram of bandwidth, a subband, and a resource block group of a terminal device.

For example, as shown in FIG. 6, a bandwidth part 2 is the bandwidth of the terminal device. The bandwidth of the terminal device may be divided into 12 subbands numbered 1 to 12 with a same bandwidth value, and each subband is divided into four RBGs. It should be understood that, for an example of a reason described later, FIG. 6 shows only composition of RBGs in some subbands: subbands 2, 3, 5, 7, and 11.

It should be understood that the bandwidth of the terminal device may be understood as a maximum bandwidth that can be supported by the terminal device.

In one embodiment, the bandwidth of the terminal device is divided into a plurality of subbands, and bandwidth values of the plurality of subbands may be the same. Sizes of RBGs included in each subband may also be the same.

It should be understood that, because an RBG size may be 2, 3, 4, 6, 8, or 16 RBs, a size of a subband may be configured as 6×N or 8×N RBs.

As described above, the bandwidth part needs to be less than or equal to the bandwidth of the terminal device. Therefore, the bandwidth part also needs to include a plurality of consecutive subbands in frequency domain in the bandwidth of the terminal device. A quantity of subbands that form the bandwidth part is less than or equal to a quantity of subbands that form the bandwidth of the terminal device. For example, as shown in FIG. 6, the bandwidth of the terminal device includes 12 subbands, and the bandwidth part includes 10 subbands.

The first information subfield is further used to indicate at least one subband on which a frequency domain resource of the data channel is located in the one or more active bandwidth parts to which the terminal device needs to be handed over, and the second information subfield is used to indicate a location of the frequency domain resource of the data channel in a physical resource block on the at least one subband.

It should be understood that the first information subfield and the second information subfield may be separately implemented in a bitmap (bitmap) form, or may be implemented in another form. This is not limited in this application.

To be specific, when the first information field indicates that the active bandwidth part of the terminal device needs to be switched, the network device may divide the bandwidth of the terminal device into subbands, indicate a subband of the frequency domain resource of the data channel by using the first field (e.g., first information subfield) in the second indication information field, and indicate a location of a resource block group of the data channel on the subband by using the second field (e.g., second information subfield), thereby avoiding allocation of corresponding bits to resource block groups of frequency domain resources that do not need to be used to transmit the data channel, and reducing overheads of downlink control information.

In one embodiment, the network device may preconfigure the one or more bandwidth parts by using higher layer signaling.

Specifically, when configuring the one or more bandwidth parts, the network device may configure the following several pieces of information about the bandwidth part: for example, a subcarrier spacing (Numerology) of a subcarrier in the bandwidth part, a frequency domain resource location of the bandwidth part, and a bandwidth value of the bandwidth part. The bandwidth value may be represented by a quantity of RBs, and the frequency domain resource location of the bandwidth part may be a center frequency location of the bandwidth part, a start frequency domain resource location of the bandwidth part, an end frequency domain resource location of the bandwidth part, or the like.

It should be noted that in NR, information about the subcarrier spacing and the bandwidth value of the bandwidth part may be further configured in a semi-static manner, and the frequency domain resource location of the bandwidth part may be further dynamically configured.

In one embodiment, when the first information field indicates that the active bandwidth part of the terminal device needs to be switched, the second information field includes a first information subfield and a second information subfield. The first information subfield may be used to indicate index numbers of the one or more active bandwidth parts to which the terminal device needs to be handed over in a plurality of bandwidth parts preconfigured by the network device for the terminal device. The second information subfield indicates the frequency domain resource location of the data channel in the one or more active bandwidth parts to which the terminal device needs to be handed over.

Specifically, the first information subfield may "implicitly" indicate the one or more active bandwidth parts to which the terminal device needs to be handed over. For example, the network device may configure an index number for each of the plurality of preconfigured bandwidth parts, so that the network device may indicate, by using the index number, the corresponding one or more active bandwidth parts to which the terminal device needs to be handed over, thereby reducing signaling overheads.

In one embodiment, the network device may configure an index number of a bandwidth part, and indicate an index number of each of a plurality of bandwidth parts by using higher layer signaling. In addition, the network device may further indicate a frequency domain resource location and/or a bandwidth value of each of the plurality of bandwidth parts by using higher layer signaling.

In one embodiment, when the first information subfield is used to indicate one active bandwidth part to which the terminal device needs to be handed over in one or more bandwidth parts, the first information subfield may include a plurality of bits, each of the plurality of bits corresponds to one subband in the bandwidth of the terminal device, a location, in the first information subfield, of the first bit with a first bit value in the first information subfield and a location, in the first information subfield, of the last second bit with the first bit value in the first information subfield indicate a frequency domain resource location of the active bandwidth part to which the terminal device needs to be handed over, and/or a value of bandwidth between a subband corresponding to the first bit and a subband corresponding to the second bit indicates a bandwidth value of the active bandwidth part to which the terminal device needs to be handed over.

In one embodiment, a location, in the first information subfield, of each bit with the first bit value in the first information subfield may be used to indicate frequency domain resource locations and bandwidth values of the one or more active bandwidth parts to which the terminal device needs to be handed over.

In one embodiment, each bit with the first bit value in the first information subfield is further used to indicate a subband on which the frequency domain resource of the data channel is located in the active bandwidth part to which the terminal device needs to be handed over.

In one embodiment, the second information subfield is used to indicate a location of the frequency domain resource of the data channel in a physical resource block on the at least one subband. Specifically, the second information subfield may include a plurality of bits, and each of the plurality of bits corresponds to one resource block group (RBG) in bandwidth including subbands corresponding to bits with the first bit value in the first information subfield.

It should be understood that the first bit value may be "0", and correspondingly, another bit value of a bit is "1". Alternatively, the first bit value may be "1", and correspondingly, another bit value of a bit is "0". This is not limited in this application. For ease of description, in the following embodiment, a description is made by using an example in which the first bit value in the second information subfield is "1".

In one embodiment, the second information subfield is used to indicate a frequency domain resource location of the frequency domain resource of the data channel on the at least one subband. Specifically, the second information subfield may be used to indicate one type of resource block group mapping mode in a resource block group mapping mode set, the resource block group mapping mode includes a granularity of a resource block group and a frequency domain resource location of the resource block group on a subband corresponding to each bit with the first bit value in the first field, and the resource block group mapping mode set includes at least one type of resource block group mapping mode.

The granularity of the resource block group may be physical resource blocks included in one resource block group.

Figure 7:
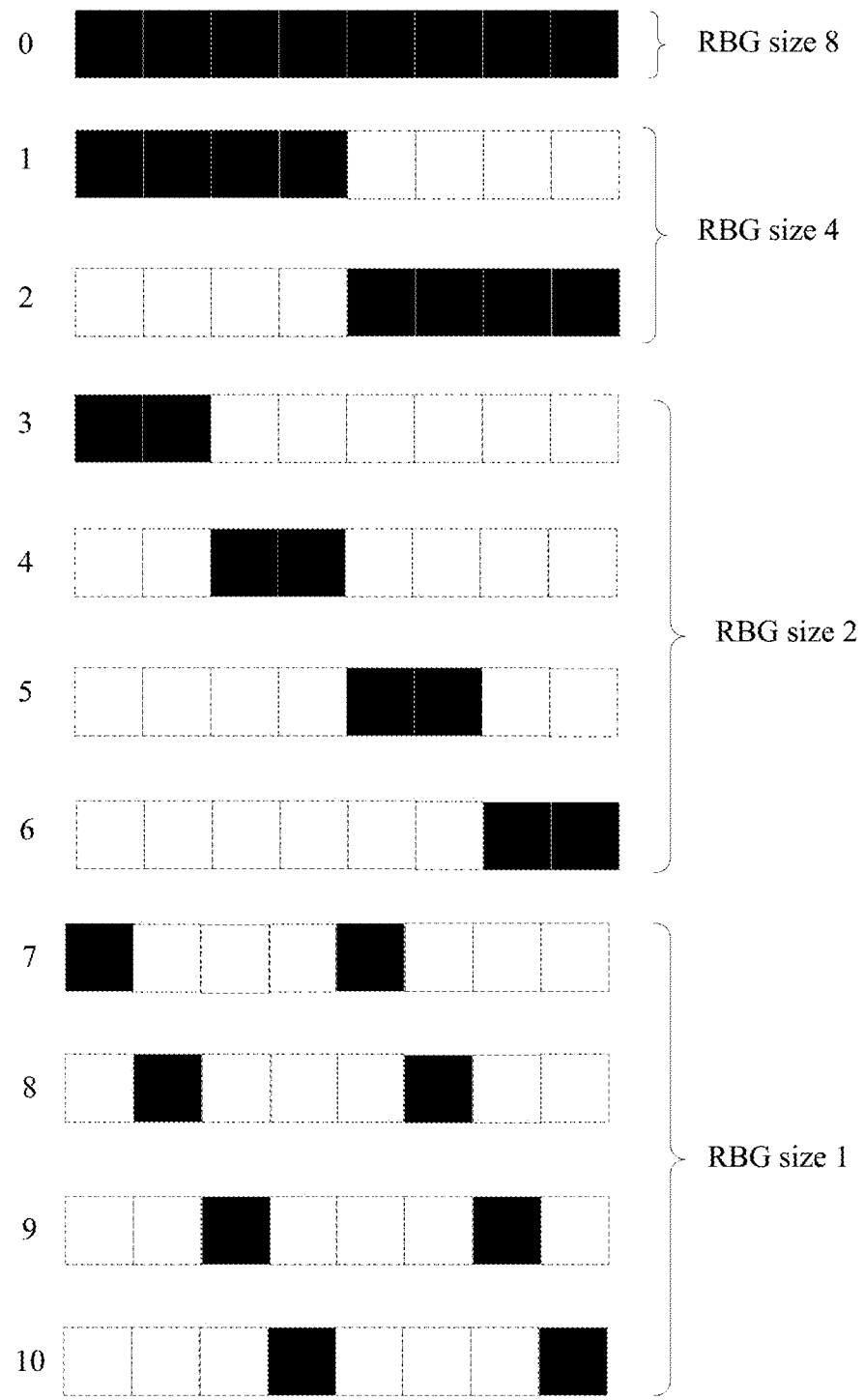
FIG. 7 is a schematic diagram of a resource block mapping mode on a subband.

For example, when a bandwidth value of one subband is eight RBs, and quantities of RBs included in RBGs are respectively 1, 2, 3, 4, and 8, the resource block group mapping mode set may be resource block mapping modes shown in FIG. 7.

In one embodiment, the network device may configure a resource block group mapping mode set for the terminal device by using higher layer signaling.

In one embodiment, the network device may configure an index number for each type of resource block group mapping mode, and indicate the index number of the resource block group mapping mode by using the second information subfield.

In one embodiment, when the first information field is used to indicate that the active bandwidth part of the terminal device does not need to be switched, the second information field is used to indicate at least one resource block group in the currently accessed bandwidth part. The first information field may need only one bit. In a conventional solution, a plurality of bits need to be added to indicate the active bandwidth part of the terminal device, to be specific, when the active bandwidth part is not switched, the active bandwidth part of the terminal still needs to be determined again. In contrast, in this application, overheads of downlink control information are reduced.

Specifically, when the first information field indicates that the active bandwidth part of the terminal device is not switched, each of all bits included in the second information field may correspond to one resource block group in the currently accessed bandwidth part. The network device may determine, as the frequency domain resource of the data channel, a resource block group corresponding to a bit with the first bit value.

It should be understood that the first bit value in the second information field may be "0" or "1". This is not limited in this application.

In one embodiment, a quantity of bits included in the second information field may be determined by using a bandwidth value of the bandwidth of the terminal device and a mapping relationship between different system bandwidth values and a quantity of resource blocks included in a resource block group.

Specifically, the network device may preconfigure a mapping relationship between a system bandwidth value and a quantity of resource blocks included in a resource block group, as shown in Table 1. In this way, the network device determines, based on the mapping relationship and the bandwidth value of the bandwidth of the terminal device, the quantity of bits included in the second information field.

In one embodiment, when the first information field indicates that the active bandwidth part of the terminal device needs to be switched, the second information field includes a first information subfield and a second information subfield. The network device may alternatively configure a quantity of bits occupied by the second information field as a fixed value, and the fixed value is the same as a quantity of bits occupied by the second information field when the first information field indicates that the active bandwidth part of the terminal device does not need to be switched. In this way, the terminal device may monitor only fixed-size downlink control information and does not need to perform blind detection based on a plurality of possible sizes of downlink control information, thereby reducing complexity of monitoring downlink control information by the terminal device.

Specifically, when each of the plurality of bits included in the first information subfield corresponds to one subband in the bandwidth of the terminal device, the total quantity of bits included in the second information field may be determined based on the bandwidth value of the bandwidth of the terminal device and the mapping relationship between different system bandwidth values and a quantity of resource blocks included in a resource block group. Then the network device determines, based on a quantity of bits included in the first information subfield and the total quantity of bits included in the second information field, the quantity of bits included in the second information subfield.

In one embodiment, the network device may indicate, by using higher layer signaling or a system message, a quantity of bits included in the second information field.

In one embodiment, the network device and the terminal device may pre-determine the quantity of bits included in the second information field, thereby further reducing signaling overheads.

In one embodiment, when the first information field included in the downlink control information indicates that the active bandwidth part of the terminal device needs to be switched, the second information field included in the downlink control information may indicate the one or more active bandwidth parts to which the terminal device needs to be handed over and the frequency domain resource location of the data channel in the active bandwidth parts to which the terminal device needs to be handed over, or a second information field included in next downlink control information may indicate the one or more active bandwidth parts to which the terminal device needs to be handed over and the frequency domain resource location of the data channel in the active bandwidth parts to which the terminal device needs to be handed over.

To be specific, when the first information field included in the downlink control information indicates that the active bandwidth part of the terminal device needs to be switched, the second information field included in the downlink control information may indicate a frequency domain resource location of the data channel in the currently accessed active bandwidth part, and the second information field included in the next downlink control information indicates the one or more active bandwidth parts to which the terminal device needs to be handed over and the frequency domain resource location of the data channel in the active bandwidth parts to which the terminal device needs to be handed over.

In one embodiment, when the first information field included in the downlink control information indicates that the active bandwidth part of the terminal device does not need to be switched, a second information field included in next downlink control information may be used to indicate a frequency domain resource location of the data channel in an active bandwidth part accessed when the next downlink control information is received, or the second information field included in the downlink control information is used to indicate the frequency domain resource location of the data channel in the currently accessed active bandwidth part.

It should be understood that the network device and the terminal device may agree in advance whether the terminal device needs to be handed over based on the second information field of the downlink control information or the second information field of the next downlink control information, when the first information field included in the downlink control information indicates that the terminal device needs to be handed over. This is not limited in this application.

In one embodiment, when the first information field included in the downlink control information indicates that the active bandwidth part of the terminal device needs to be switched, and the second information field included in the downlink control information indicates the one or more active bandwidth parts to which the terminal device needs to hand over and the frequency domain resource location of the data channel in the active bandwidth parts to which the terminal device needs to hand over, the terminal device may determine, in advance based on a bandwidth value of an active bandwidth part to which the terminal device needs to hand over, a quantity of bits occupied by the next downlink control information, thereby reducing a quantity of blind detection times.

Returning back to FIG. 5, in operation 502, the network device sends the downlink control information. Correspondingly, the terminal device receives the downlink control information.

Operation 503. When the first information field indicates that the active bandwidth part of the terminal device needs to be switched, the terminal device determines, based on the second information field, the one or more active bandwidth parts to which the terminal device needs to be handed over and the frequency domain resource location of the data channel in the active bandwidth parts to which the terminal device needs to be handed over.

Specifically, the terminal device may determine, based on the first information field, whether the active bandwidth part needs to be switched. When the first information field indicates that the active bandwidth part of the terminal device needs to be switched, the terminal device determines, based on the second information field, an active bandwidth part to which the terminal device needs to be handed over and a frequency domain resource location of the data channel in the active bandwidth part to which the terminal device needs to be handed over.

In one embodiment, the terminal device may select, from the plurality of bandwidth parts based on the first information subfield in the second information field, the one or more active bandwidth parts to which the terminal device needs to be handed over. In addition, as described above, both the bandwidth of the terminal device and the bandwidth part may include a plurality of subbands, and the first information subfield may be further used to indicate at least one subband on which a frequency domain resource of the data channel is located in the one or more active bandwidth parts to which the terminal device needs to be handed over. Therefore, the terminal device may further determine, based on the first information subfield, the at least one subband on which the frequency domain resource of the data channel is located in the one or more active bandwidth parts to which the terminal device needs to be handed over, and determine, based on the second information subfield in the second information field, a location of the frequency domain resource of the data channel in a physical resource block on the at least one subband.

In one embodiment, when the first information field indicates that the active bandwidth part of the terminal device is switched, the first information subfield may include a plurality of bits, and each of the plurality of bits corresponds to one subband in the bandwidth of the terminal device. The terminal device may select, from the plurality of bandwidth parts configured by the network device for the terminal device and based on a location, in the first information subfield, of the first bit with the first bit value in the first information subfield and a location, in the first information subfield, of the last bit with the first bit value in the plurality of bits included in the first information subfield, one active bandwidth part to which the terminal device needs to be handed over.

Specifically, the terminal device may determine, based on the location, in the first information subfield, of the first bit with the first bit value in the first information subfield and the location, in the first information subfield, of the last bit with the first bit value in the first information subfield, a frequency domain resource location of the active bandwidth part to which the terminal device needs to be handed over, namely, a start frequency domain location, a frequency domain location of a center frequency, or an end frequency domain location of the active bandwidth part to which the terminal device needs to be handed over. The terminal device may further determine, based on a value of bandwidth between a subband corresponding to the first bit with the first bit value in the first information subfield and a subband corresponding to the last bit with the first bit value in the first information subfield, a bandwidth value of the active bandwidth part to which the terminal device needs to be handed over. In this way, the terminal device determines, based on the frequency domain location of the active bandwidth part to which the terminal device needs to be handed over and/or the bandwidth value of the active bandwidth part to which the terminal device needs to be handed over, the active bandwidth part to which the terminal device needs to be handed over.

For example, if a bandwidth value of only one first bandwidth part in the plurality of bandwidth parts configured by the network device is the same as a bandwidth value of one active bandwidth part to which the terminal device needs to be handed over and that is indicated by the network device, the first bandwidth part is determined as an active bandwidth part to which the terminal device needs to be handed over. If a start frequency domain location of only one second bandwidth part in the plurality of bandwidth parts configured by the network device is the same as a start frequency domain location of one active bandwidth part to which the terminal device needs to be handed over and that is indicated by the network device, the second bandwidth part is determined as an active bandwidth part to which the terminal device needs to be handed over. When the terminal device cannot determine, based on one of the bandwidth value of the active bandwidth part to which the terminal device needs to be handed over and the frequency domain resource location of the active bandwidth part to which the terminal device needs to be handed over, a specific location of the active bandwidth part to which the terminal device needs to be handed over, the terminal device determines, based on both the bandwidth value of the active bandwidth part to which the terminal device needs to be handed over and the frequency domain resource location of the active bandwidth part to which the terminal device needs to be handed over, the specific location of the active bandwidth part to which the terminal device needs to be handed over.

In one embodiment, when configuring the plurality of bandwidth parts for the terminal device, a base station may configure bandwidth values and frequency domain locations of the bandwidth parts at the same time, and the plurality of bandwidth parts do not overlap each other. When the first information field indicates that the active bandwidth part of the terminal device is switched, the first information subfield may include a plurality of bits, and each of the plurality of bits corresponds to one subband in the bandwidth of the terminal device. The terminal device may select, from the plurality of bandwidth parts configured by the network device for the terminal device and based on a location, in the first information subfield, of each bit with the first bit value in the plurality of bits included in the first information subfield, one or more active bandwidth parts to which the terminal device needs to be handed over. It should be understood that quantities of subbands included in the plurality of bandwidth parts configured by the network device for the terminal device may be different, or may be partially the same. This is not limited in this application.

In one embodiment, the terminal device may determine a subband corresponding to each bit with the first bit value in the first information subfield as a subband on which a frequency domain resource of the data channel is located in the active bandwidth part to which the terminal device needs to be handed over.

In one embodiment, the terminal device may further determine, based on a physical resource block group corresponding to a bit with the first bit value in the plurality of bits included in the second information subfield, as a physical resource block group used to transmit the data channel.

Specifically, each of the plurality of bits included in the second information subfield corresponds to one resource block group in bandwidth including subbands corresponding to bits with the first bit value in the first information subfield.

The following describes this embodiment by using a specific example. If a bandwidth of the terminal device is 192 RBs, and a bandwidth value of a subband is 16 RBs, the bandwidth of the terminal device may be divided into N=196/16=12 subbands. As shown in FIG. 6, the 12 subbands may be numbered 1 to 12.

If a bandwidth part currently accessed by the terminal device is system bandwidth, namely, the bandwidth part 2 in FIG. 6, and the first information field included in the downlink control information received by the terminal device indicates that the active bandwidth part of the terminal device needs to be switched, the terminal device determines, based on the second information field included in the downlink control information, the active bandwidth part to which the terminal device needs to be handed over. If values of bits included in the first information subfield included in the second information field are 0110 10 10 00 10, the active bandwidth part to which the terminal device needs to be handed over is selected from the plurality of bandwidth parts configured by the network device and based on a location, in the first information subfield, of the first bit being "1" in the first information subfield and a location, in the first information subfield, of the last bit being "1" in the first information subfield, namely, a bandwidth part 1 in FIG. 6. In addition, the terminal device determines, based on bits whose bit value is "1" in bits included in the first information subfield, that RBGs exist in subbands numbered 2, 3, 5, 7, and 11. The terminal device determines, based on the second information subfield in the downlink control information, an RBG corresponding to a bit whose bit value is "1" in bandwidth including subbands numbered 2, 3, 5, 7, and 11 as an RBG used to transmit the data channel.

In one embodiment, the terminal device may also determine one or more bandwidth parts that include subbands corresponding to bits whose value is "1" as active bandwidth parts to which the terminal device needs to be handed over.

In one embodiment, as described above, the terminal device may also determine, based on the first information field, an index number of the active bandwidth part to which the terminal device needs to be handed over, and further determine, based on the index number of the active bandwidth part to which the terminal device needs to be handed over, the active bandwidth part to which the terminal device needs to be handed over.

In one embodiment, the terminal device may determine an index number of each of the one or more bandwidth parts and a frequency domain resource location and/or a bandwidth value of each bandwidth part based on higher layer signaling.

In one embodiment, the second information subfield may indicate one type of resource block group mapping mode in a resource block group mapping mode set, the resource block group mapping mode includes a granularity of a resource block group and a frequency domain resource location of the resource block group on a subband corresponding to each bit with the first bit value in the first information subfield, and the resource block group mapping mode set includes at least one type of resource block group mapping mode. In this way, the terminal device may determine, based on the second information subfield, a mapping manner of a resource block group on the subband corresponding to each bit with the first bit value in the first information subfield, so that the terminal device determines at least one resource block group based on the mapping manner of the resource block group on each subband corresponding to each bit with the first bit value in the first information subfield.

Specifically, as shown in FIG. 7, if a bandwidth value of one subband is eight RBs, and an RBG also includes eight RBs, there is only one type of resource block group mapping mode. If an RBG includes four RBs, there may be two types of resource block group mapping modes. If an RBG includes two RBs, there may be four types of resource block group mapping modes. If an RBG includes one RB, there may be four types of resource block group mapping modes.

In one embodiment, the network device may configure an index number for each type of resource block group mapping mode, and indicate the index number of the resource block group mapping mode by using a bit included in the second information subfield. The terminal device determines the resource block group mapping mode based on the bit included in the second information subfield.

For example, if a bandwidth value of one subband is eight RBs, and an RBG includes four RBs, the second information subfield may include one bit. If the bit is "1", it indicates that a resource block group mapping mode in the subfield is a mode 1 in FIG. 7; or if the bit is "0", it indicates that a resource block group mapping mode in the field is a mode 2 in FIG. 7.

In one embodiment, the second information subfield may indicate a resource block group mapping mode of each of the plurality of subbands corresponding to each bit with the first bit value in the first information subfield.

Figure 8:
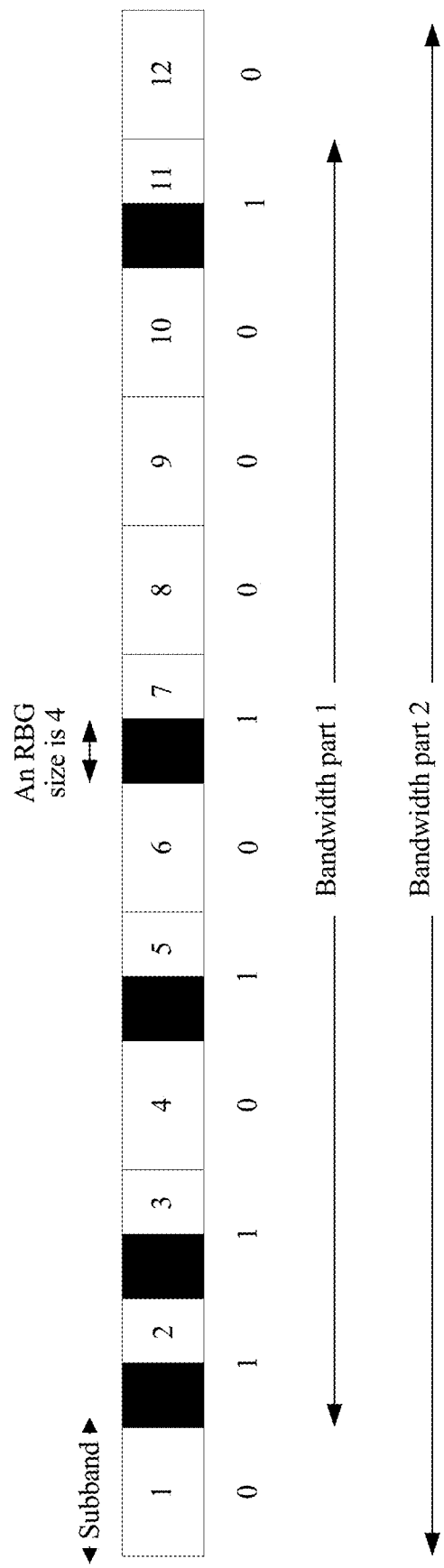
FIG. 8 is a schematic diagram of another specific embodiment of this application.

The following describes this embodiment by using a specific example. If a value of the bandwidth of the terminal device is 96 RBs, and a bandwidth value of a subband is eight RBs, the bandwidth of the terminal device may be divided into N=96/8=12 subbands. As shown in FIG. 8, the 12 subbands may be numbered 1 to 12.

If a bandwidth part currently accessed by the terminal device is system bandwidth, namely, a bandwidth part 2 in FIG. 8, and the first information field included in the downlink control information received by the terminal device indicates that the active bandwidth part of the terminal device is switched, the terminal device determines, based on the second information field included in the downlink control information, the active bandwidth part to which the terminal device needs to be handed over. If values of bits included in the first information subfield included in the second information field are 011010100010, the active bandwidth part to which the terminal device needs to be handed over is selected from the plurality of bandwidth parts configured by the network device and based on a location, in the first information subfield, of the first bit being 1 in the first information subfield and a location, in the first information subfield, of the last bit being 1 in the first information subfield, namely, a bandwidth part 1 in FIG. 8. In addition, the terminal device determines, based on bits whose bit value is "1" in bits included in the first information subfield, that RBGs exist in subbands numbered 2, 3, 5, 7, and 11. The terminal device may further determine, based on values of bits included in the second information field, that a mapping manner of an RBG in each of the subbands numbered 2, 3, 5, 7, and 11 is the mode 1 in FIG. 7, determine that an RBG includes four RBs, and determine that RBGs used to transmit the data channel on each subband are the first four RBGs.

It should be understood that resource mapping manners on subbands may be the same or different. This is not limited in this embodiment of this application.

Operation 504. When the first information field indicates that the active bandwidth part of the terminal device does not need to be switched, the terminal device determines the frequency domain resource location of the data channel in the currently accessed active bandwidth part based on the second information field.

It should be understood that the terminal device may perform one of operation 503 or operation 504.

In one embodiment, the terminal device determines the frequency domain resource of the data channel based on the first information field and the second information field, and may further determine at least one resource block group in the currently accessed active bandwidth part based on the second information field when the first information field indicates that the active bandwidth part of the terminal device does not need to be switched.

In one embodiment, when the first information field indicates that the active bandwidth part of the terminal device does not need to be switched, the second information field may also include a first information subfield and a second information subfield, where the first information subfield is used to indicate at least one subband on which a frequency domain resource of the data channel is located in the currently accessed active bandwidth part, and the second information subfield is used to indicate a location of a frequency domain resource of the data channel in a physical resource block on the at least one subband, thereby further reducing overheads of downlink control information.

A specific implementation may be the same as an implementation in which the first information field indicates that the active bandwidth part of the terminal device needs to be switched. To avoid repetition, details are not described herein again.

For example, when the first information field indicates that the active bandwidth part of the terminal device needs to be switched, each bit with the first bit value in the first information subfield is used to indicate a subband on which the frequency domain resource of the data channel is located in the "active bandwidth part to which the terminal device needs to be handed over"; when the first information field indicates that the active bandwidth part of the terminal device needs to be switched, each bit with the first bit value in the first information subfield may be used to indicate a subband on which the frequency domain resource of the data channel is located in the "currently accessed active bandwidth part".

In one embodiment, the second information field includes a plurality of bits, and the terminal device may determine, based on values of the plurality of bits included in the second information field, at least one resource block group in the currently accessed active bandwidth part.

It should be noted that, when the first information field indicates that the active bandwidth part of the terminal device is not switched, and when the first information field indicates that the active bandwidth part of the terminal device is switched, the network device may configure that second information fields include a same quantity of bits. To be specific, quantities of bits included in the downlink control information in the foregoing two cases are also the same. In this way, the terminal device may monitor only fixed-size downlink control information and does not need to perform blind detection based on a plurality of possible sizes of downlink control information, thereby reducing complexity of monitoring downlink control information by the terminal device.

For example, in FIG. 6, a value of the bandwidth of the terminal device is 192 RBs. If the RBG includes six RBs, the network device may use all 192/6=32 bits as bits included in the second information field when the first information field indicates that the active bandwidth part of the terminal device is not switched. When the first information field indicates that the active bandwidth part of the terminal device is switched, each of the bits included in the first information subfield in the second information field indicates each subband included in the bandwidth of the terminal device, to be specific, the first information subfield occupies 192/16=12 bits. In this way, the second information subfield may occupy 32−12=20 bits. It may be learned from FIG. 6 that an RBG of the data channel exists in the five subbands indicated by the first information subfield. In this way, a value of bandwidth including the five subbands indicated by the first information subfield is 16×5=80 RBs. Therefore, a quantity of RBs included in an RBG represented by each bit is 80/20=4. In this way, the network device may transmit the data channel in an RBG with a bit value of 1 in the bandwidth including the five subbands in FIG. 6.

It should be noted that when the value of the bandwidth of the terminal device is 192 RBs, a quantity of RBs included in the RBG is not specifically defined in the standard. Therefore, the quantity of RBs included in the RBG may be another value. This is not limited in this application.

In one embodiment, the network device may further determine a size and a location of a radio frequency (RF) bandwidth part of the terminal device based on a bandwidth value and a location of an active bandwidth part, and then adjust a bandwidth of the RF, so as to effectively reduce power consumption of the terminal device, balance a system load, and improve spectrum utilisation.

Figure 9:
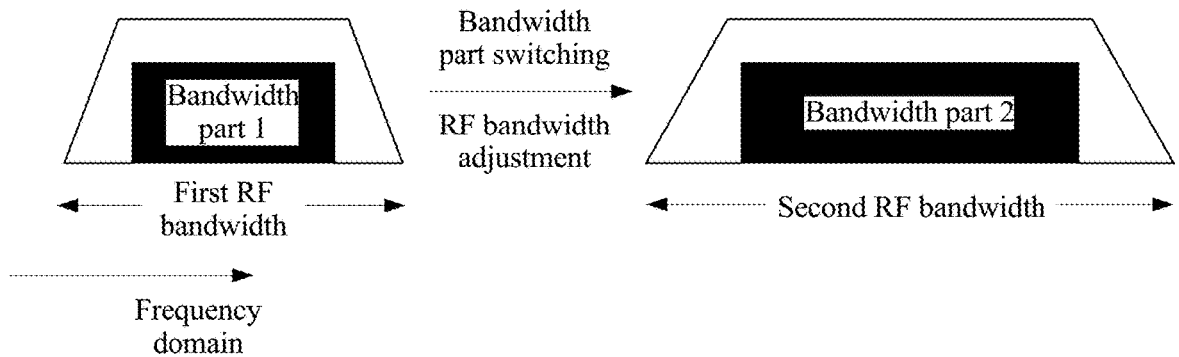
FIG. 9 is a schematic diagram of a relationship between an active bandwidth part and a radio frequency bandwidth part.

For example, as shown in FIG. 9, when a required service data volume is relatively small (for example, a voice service), the network device may enable the terminal device to work in a first bandwidth part (First RF bandwidth) with a relatively small RF bandwidth. When large-volume data (for example, a video service) needs to be transmitted, the network device may adjust the terminal device to work in a second bandwidth part (Second RF bandwidth) with a relatively large RF bandwidth.

In one embodiment, the terminal device may receive the data channel at the frequency domain resource location of the data channel, or may send the data channel at the frequency domain resource location of the data channel.

Therefore, according to the resource allocation method in this embodiment of this application, the network device indicates, by using the first information field included in the downlink control information, whether the active bandwidth part of the terminal device needs to be switched. When the bandwidth part does not need to be switched, the second information field may be used to indicate the frequency domain resource location of the data channel in the currently accessed active bandwidth part. In the conventional solution, a plurality of bits need to be added to indicate the active bandwidth part of the terminal device. In contrast, in this embodiment of this application, overheads of downlink control information are reduced. When the first information field indicates that the active bandwidth part of the terminal device needs to be switched, the network device may divide the bandwidth of the terminal device into subbands, and indicate a subband of the frequency domain resource of the data channel and indicate a location of a resource block group of the data channel on the subband by using the second indication information field, thereby avoiding allocation of corresponding bits to resource block groups of frequency domain resources that do not need to be used to transmit the data channel, and reducing overheads of downlink control information. In addition, when the first information field indicates that the active bandwidth part of the terminal device is not switched, and when the first information field indicates that the active bandwidth part of the terminal device is switched, the network device may configure that second information fields include a same quantity of bits. In this way, the terminal device may monitor only fixed-size downlink control information and does not need to perform blind detection based on a plurality of possible sizes of downlink control information, thereby reducing complexity of monitoring downlink control information by the terminal device.

Figure 10:
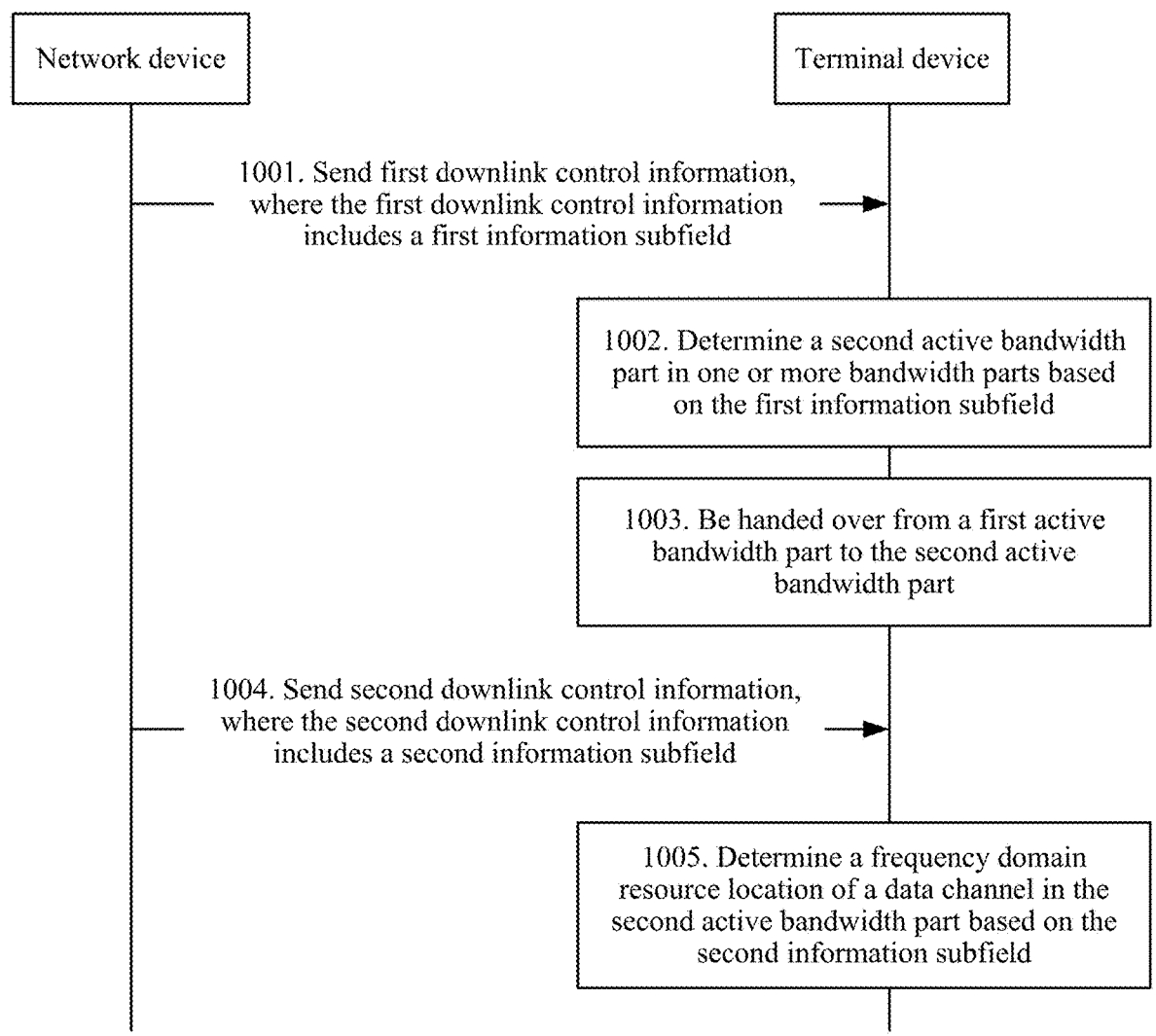
FIG. 10 is a schematic flowchart of a resource allocation method according to another embodiment of this application.

FIG. 10 is a schematic flowchart of a resource allocation method according to another embodiment of this application.

Operation 1001. A network device sends first downlink control information, where the first downlink control information includes a first information subfield.

The first information subfield is used to indicate that a terminal device is handed over from a first active bandwidth part to a second active bandwidth part in one or more bandwidth parts. The first active bandwidth part is a bandwidth part currently accessed by the terminal device, and the second active bandwidth part is a bandwidth part to which the terminal device needs to be handed over.

It should be understood that the first active bandwidth part may be one or more currently accessed active bandwidth parts, or the second active bandwidth part may be one or more active bandwidth parts to which the terminal device needs to be handed over. This is not limited in this application.

It should be further understood that there may be a part of overlapping bandwidth between the first active bandwidth part and the second active bandwidth part.

In one embodiment, in this embodiment of this application, the first downlink control information may include another information field, for example, the first information field in the embodiment of FIG. 5. The first information field is used to indicate whether to perform active bandwidth switching. If the active bandwidth switching is to be performed, the terminal device may perform this embodiment of this application.

In one embodiment, in this application document, a concept of a subband in a bandwidth part is introduced. Bandwidth of the terminal device may be divided into a plurality of subbands. To be specific, the bandwidth of the terminal device includes a plurality of consecutive subbands in frequency domain, and each subband includes a plurality of consecutive physical resource blocks RBs in frequency domain. The first active bandwidth part includes a plurality of consecutive subbands in frequency domain in the bandwidth of the terminal device, and the second active bandwidth part includes a plurality of consecutive subbands in frequency domain in the bandwidth of the terminal device.

It should be understood that the bandwidth of the terminal device may be understood as a maximum bandwidth that can be supported by the terminal device.

In one embodiment, bandwidth values of the subbands included in the bandwidth of the terminal device are the same.

In one embodiment, the first information subfield is further used to indicate at least one subband on which a frequency domain resource of a data channel is located in the second active bandwidth part.

It should be understood that the first information subfield and a second information subfield may be separately implemented in a bitmap (bitmap) form, or may be implemented in another form. This is not limited in this application.

In one embodiment, the network device may preconfigure the one or more bandwidth parts by using higher layer signaling.

Specifically, when configuring the one or more bandwidth parts, the network device may configure the following several pieces of information about the bandwidth part: for example, a subcarrier spacing of a subcarrier in the bandwidth part, a frequency domain resource location of the bandwidth part, and a bandwidth value of the bandwidth part. The bandwidth value may be represented by a quantity of RBs, and the frequency domain resource location of the bandwidth part may be a center frequency location of the bandwidth part, a start frequency domain resource location of the bandwidth part, an end frequency domain resource location of the bandwidth part, or the like.

It should be noted that in NR, information about the subcarrier spacing and the bandwidth value of the bandwidth part may be further configured in a semi-static manner, and the frequency domain resource location of the bandwidth part may be further dynamically configured.

In one embodiment, the first information subfield may be used to indicate an index number of the second active bandwidth part.

Specifically, the first information subfield may "implicitly" indicate the second active bandwidth part. For example, the network device may configure an index number for each of the plurality of preconfigured bandwidth parts, so that the network device may indicate a corresponding second active bandwidth part by using the index number, thereby reducing signaling overheads.

In one embodiment, the network device may configure an index number of a bandwidth part, and indicate an index number of each of the one or more bandwidth parts by using higher layer signaling. In addition, the network device may further indicate a frequency domain resource location and/or a bandwidth value of each of the plurality of bandwidth parts by using higher layer signaling.

In one embodiment, the first information subfield includes a plurality of bits, each of the plurality of bits corresponds to one subband in the bandwidth of the terminal device, and a location, in the first information subfield, of the first bit with a first bit value in the first information subfield and a location, in the first information subfield, of the last bit with the first bit value in the first information subfield are used to indicate a frequency domain resource location of the second active bandwidth part; and/or a value of bandwidth between a subband corresponding to the first bit with the first bit value in the first information subfield and a subband corresponding to the last bit with the first bit value in the first information subfield indicates a bandwidth value of the second active bandwidth part.

In one embodiment, the network device may indicate, as the second active bandwidth part, one or more bandwidth parts that include a subband corresponding to each bit with the first bit value in the first information subfield.

In one embodiment, each bit with the first bit value in the first information subfield is further used to indicate a subband on which the frequency domain resource of the data channel is located in the second active bandwidth part.

Operation 1002. The terminal device determines the second active bandwidth part in the one or more bandwidth parts based on the first information subfield.

In one embodiment, as described above, before the terminal device receives the first downlink control information, the terminal device may further receive higher layer signaling. The terminal device determines, based on the higher layer signaling, a bandwidth value and/or a frequency domain resource location of each of the one or more bandwidth parts that are configured by the network device for the terminal device. In this way, the terminal device may select the second active bandwidth part from the plurality of bandwidth parts based on the first information subfield.

In one embodiment, as described above, both the bandwidth of the terminal device and the bandwidth part may include a plurality of subbands, and the first information subfield may be further used to indicate at least one subband on which a frequency domain resource of the data channel is located in the second active bandwidth part. Therefore, the terminal device may further determine, based on the first information subfield, the at least one subband on which the frequency domain resource of the data channel is located in the second active bandwidth part.

In one embodiment, as described above, the first information subfield may include a plurality of bits, and each of the plurality of bits corresponds to one subband in the bandwidth of the terminal device. The terminal device may select the second active bandwidth part from the plurality of bandwidth parts configured by the network device for the terminal device and based on a location, in the first information subfield, of the first bit with the first bit value in the first information subfield and a location, in the first information subfield, of the last bit with the first bit value in the plurality of bits included in the first information subfield.

Specifically, the terminal device may determine a frequency domain resource location of the second active bandwidth part based on the location, in the first information subfield, of the first bit with the first bit value in the first information subfield and the location, in the first information subfield, of the last bit with the first bit value in the first information subfield, namely, a start frequency domain location, a frequency domain location of a center frequency, or an end frequency domain location of the second active bandwidth part. The terminal device may further determine a bandwidth value of the second active bandwidth part based on a value of bandwidth between a subband corresponding to the first bit with the first bit value in the first information subfield and a subband corresponding to the last bit with the first bit value in the first information subfield. In this way, the terminal device determines the second active bandwidth part based on the frequency domain location of the second active bandwidth part and/or the bandwidth value of the second active bandwidth part.

For example, if a bandwidth value of only one first bandwidth part in the plurality of bandwidth parts configured by the network device is the same as a bandwidth value of a second active bandwidth part indicated by the network device, the first bandwidth part is determined as a second active bandwidth part. If a start frequency domain location of only one second bandwidth part in the plurality of bandwidth parts configured by the network device is the same as a start frequency domain location of a second active bandwidth part indicated by the network device, the second bandwidth part is determined as a second active bandwidth part. When the terminal device cannot determine a specific location of the second active bandwidth part based on one of the bandwidth value of the second active bandwidth part and the frequency domain resource location of the second active bandwidth part, the terminal device determines the specific location of the second active bandwidth part based on both the bandwidth value of the second active bandwidth part and the frequency domain resource location of the second active bandwidth part.

It should be understood that quantities of subbands included in the plurality of bandwidth parts configured by the network device for the terminal device may be different, or may be partially the same. This is not limited in this application.

In one embodiment, the terminal device may determine a subband corresponding to each bit with the first bit value in the first information subfield as a subband on which a frequency domain resource of the data channel is located in the second active bandwidth part.

Operation 1003. The terminal device is handed over from the first active bandwidth part to the second active bandwidth part.

Operation 1004. The terminal device receives second downlink control information in the second active bandwidth part, where the second downlink control information includes a second information subfield.

Figure 11:
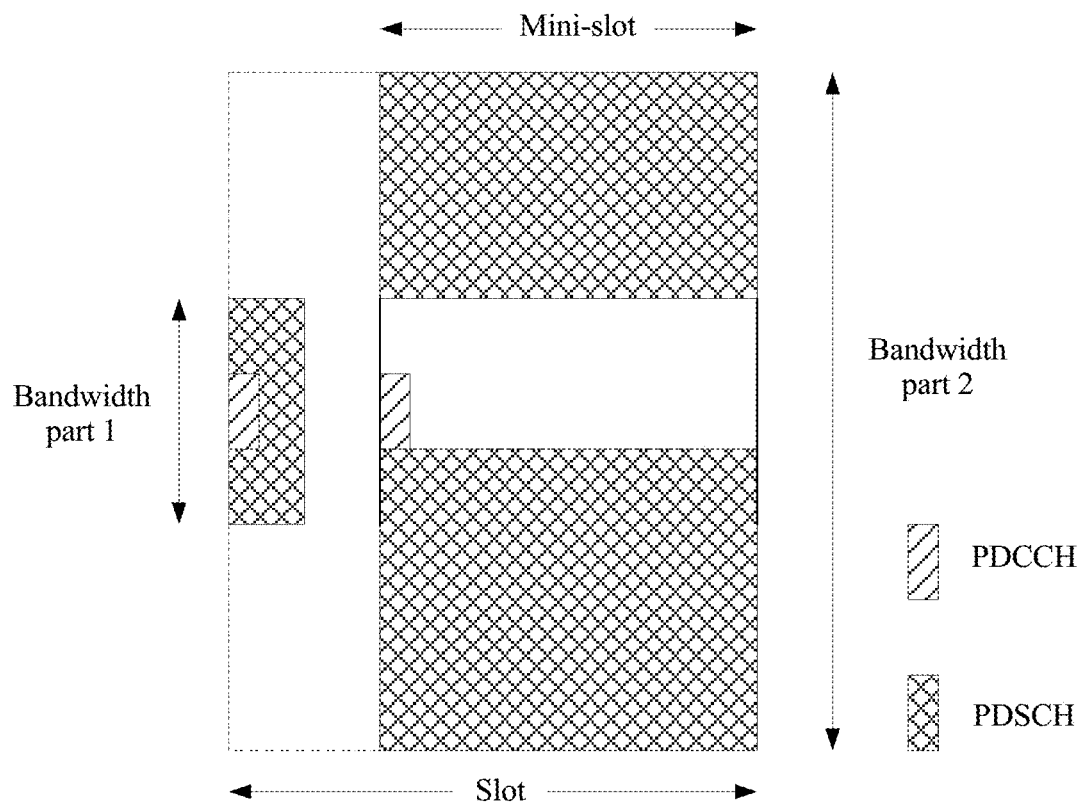
FIG. 11 is a schematic diagram of another specific embodiment of this application.

The terminal device may receive the second downlink control information in a mini-slot of one slot, as shown in FIG. 11.

In one embodiment, the second information subfield is used to indicate a location of the frequency domain resource of the data channel in a physical resource block on the at least one subband. Specifically, the second information subfield may include a plurality of bits, and each of the plurality of bits corresponds to one resource block group (RBG) in bandwidth including subbands corresponding to bits with the first bit value in the first information subfield.

It should be understood that the first bit value may be "0", and correspondingly, another bit value of a bit is "1". Alternatively, the first bit value may be "1", and correspondingly, another bit value of a bit is "0". This is not limited in this application. For ease of description, in the following embodiment, a description is made by using an example in which the first bit value in the second information subfield is "1".

In one embodiment, the second information subfield is used to indicate a frequency domain resource location of the frequency domain resource of the data channel on the at least one subband. Specifically, the second information subfield may be used to indicate one type of resource block group mapping mode in a resource block group mapping mode set, the resource block group mapping mode includes a granularity of a resource block group and a frequency domain resource location of the resource block group on a subband corresponding to each bit with the first bit value in the first field, and the resource block group mapping mode set includes at least one type of resource block group mapping mode.

The granularity of the resource block group may be physical resource blocks included in one resource block group.

For example, when a bandwidth value of one subband is eight RBs, and quantities of RBs included in RBGs are respectively 1, 2, 3, 4, and 8, the resource block group mapping mode set may be resource block mapping modes shown in FIG. 7.

In one embodiment, the network device may configure a resource block group mapping mode set for the terminal device by using higher layer signaling.

In one embodiment, the network device may configure an index number for each type of resource block group mapping mode, and indicate the index number of the resource block group mapping mode by using the second information subfield.

In one embodiment, a quantity of bits included in the second information field may be determined by using a bandwidth value of the bandwidth of the terminal device and a mapping relationship between different system bandwidth values and a quantity of resource blocks included in a resource block group.

Specifically, the network device may preconfigure a mapping relationship between a system bandwidth value and a quantity of resource blocks included in a resource block group, as shown in Table 1. In this way, the network device determines, based on the mapping relationship and the bandwidth value of the bandwidth of the terminal device, the quantity of bits included in the second information field.

Operation 1005. The terminal device determines a frequency domain resource location of the data channel in the second active bandwidth part based on the second information subfield.

In one embodiment, each of the at least one subband determined by the terminal device based on the first information subfield includes a plurality of consecutive physical resource blocks. As described above, the second information subfield is used to indicate a location of the frequency domain resource of the data channel in a physical resource block on the at least one subband. In this way, the terminal device can determine, based on the second information subfield, the location of the frequency domain resource of the data channel in the physical resource block on the at least one subband.

In one embodiment, sizes of the plurality of consecutive physical resource blocks included in each subband may be the same.

In one embodiment, the terminal device may further determine, based on a physical resource block group corresponding to a bit with the first bit value in the plurality of bits included in the second information subfield, as a physical resource block group used to transmit the data channel.

Specifically, each of the plurality of bits included in the second information subfield corresponds to one resource block group in bandwidth including subbands corresponding to bits with the first bit value in the first information subfield.

For example, as shown in FIG. 6, the network device sends a first information subfield to the terminal device by using the first DCI. A quantity of bits used by the first information subfield is 12, and the first information subfield is 011010100010. In this case, the terminal device determines, by using a location, in the first information subfield, of the first bit whose bit value is "1" and a location, in the first information subfield, of the last bit whose bit value is "1" in the first information subfield, that the second active bandwidth part is the bandwidth part 2. In addition, because the $2^{nd}$, $3^{rd}$, $5^{th}$, $7^{th}$, and $11^{th}$ bit in the first information subfield are set to 1 s, it indicates that a PDSCH is in a bandwidth part that includes the $2^{nd}$, $3^{rd}$, $5^{th}$, $7^{th}$, and $11^{th}$ subband.

After the bandwidth of the terminal device is switched, the network device sends a second information field to the terminal device by using the second DCI, and further indicates a specific frequency domain location of the PDSCH in an area of the subbands to the terminal device.

The area of the subbands includes five subbands (the $2^{nd}$, $3^{rd}$, $5^{th}$, $7^{th}$, and $11^{th}$ subband), and a bandwidth value of the area is 16×5=80 RBs. If an RBG size is 4, the second information subfield includes 80/4=20 bits. In this way, the network device may transmit the data channel in an RBG with a bit value of 1 in the bandwidth including the five subbands in FIG. 6.

In one embodiment, the second information subfield may indicate one type of resource block group mapping mode in a resource block group mapping mode set, the resource block group mapping mode includes a granularity of a resource block group and a frequency domain resource location of the resource block group on a subband corresponding to each bit with the first bit value in the first information subfield, and the resource block group mapping mode set includes at least one type of resource block group mapping mode. In this way, the terminal device may determine, based on the second information subfield, a mapping manner of a resource block group on the subband corresponding to each bit with the first bit value in the first information subfield, so that the terminal device determines at least one resource block group based on the mapping manner of the resource block group on each subband corresponding to each bit with the first bit value in the first information subfield.

In one embodiment, the network device may configure an index number for each type of resource block group mapping mode, and indicate the index number of the resource block group mapping mode by using a bit included in the second information subfield. The terminal device determines the resource block group mapping mode based on the bit included in the second information subfield.

In one embodiment, as described above, the terminal device may also determine an index number of the second active bandwidth part based on the first information subfield, and further determine the second active bandwidth part based on the index number of the second active bandwidth part.

In one embodiment, the terminal device may determine an index number of each of the one or more bandwidth parts and a frequency domain resource location and/or a bandwidth value of each bandwidth part based on higher layer signaling.

Therefore, according to the resource allocation method in this embodiment of this application, the network device indicates, by sending the first downlink control information, that the terminal device needs to be handed over from an active bandwidth part to the second active bandwidth part in the one or more bandwidth parts, and sends the second downlink control information of the second active bandwidth part, where the second downlink control information is used to indicate the frequency domain resource location of the data channel in the second active bandwidth part. In other words, in this embodiment of this application, a frequency domain resource location of a data channel can be indicated in a scenario of switching an active bandwidth part, thereby improving resource utilisation.

Figure 12:
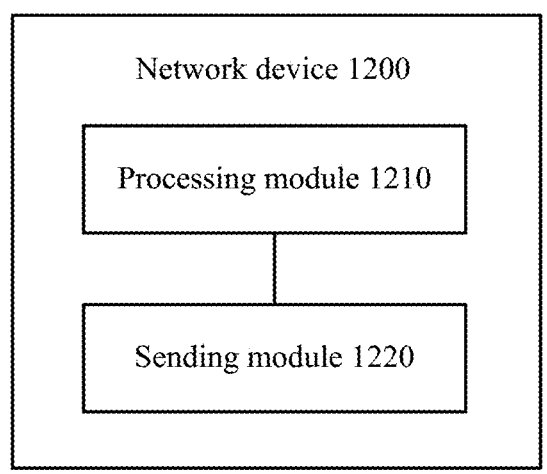
FIG. 12 is a schematic block diagram of a network device according to an embodiment of this application.

FIG. 12 is a schematic block diagram of a network device 1200 according to an embodiment of this application. As shown in FIG. 12, the network device 1200 includes:

a processing module 1210, configured to determine downlink control information, where the downlink control information includes a first information field and a second information field, and the first information field is used to indicate whether an active bandwidth part of a terminal device needs to be switched, where when the first information field indicates that the active bandwidth part of the terminal device needs to be switched, the second information field is used to indicate one or more active bandwidth parts to which the terminal device needs to be handed over and a frequency domain resource location of a data channel in the one or more active bandwidth parts to which the terminal device needs to be handed over; or when the first information field indicates that the active bandwidth part of the terminal device does not need to be switched, the second information field is used to indicate a frequency domain resource location of a data channel in a currently accessed active bandwidth part; and a sending module 1220, configured to send the downlink control information.

Therefore, the network device in this embodiment of this application determines the downlink control information, where the downlink control information includes the first information field and the second information field; and sends the downlink control information to indicate a working frequency domain resource of the terminal device by using the first information field and the second information field, so that the network device and the terminal device can accurately exchange information, thereby improving resource utilisation and communication efficiency.

In one embodiment, the first information field includes one bit.

In one embodiment, when the first information field indicates that the active bandwidth part of the terminal device needs to be switched, the second information field includes a first information subfield and a second information subfield; the first information subfield is used to indicate the one or more active bandwidth parts to which the terminal device needs to be handed over in one or more bandwidth parts, where the bandwidth part is less than or equal to bandwidth of the terminal device, the bandwidth of the terminal device includes a plurality of consecutive subbands in frequency domain, the bandwidth part includes a plurality of consecutive subbands in frequency domain in the bandwidth of the terminal device, and the subband includes a plurality of consecutive physical resource blocks RBs in frequency domain; the first information subfield is further used to indicate at least one subband on which a frequency domain resource of the data channel is located in the one or more active bandwidth parts to which the terminal device needs to be handed over; and the second information subfield is used to indicate a location of the frequency domain resource of the data channel in a physical resource block on the at least one subband.

In one embodiment, the sending module 1220 is further configured to send higher layer signaling to the terminal device, where the higher layer signaling is used to indicate a bandwidth value and/or a frequency domain resource location of each of the one or more bandwidth parts that are configured by the network device for the terminal device.

In one embodiment, the first information subfield includes a plurality of bits, each of the plurality of bits corresponds to one subband in the bandwidth of the terminal device, and a location, in the first information subfield, of the first bit with a first bit value in the first information subfield and a location, in the first information subfield, of the last bit with the first bit value in the first information subfield indicate a frequency domain resource location of one of the active bandwidth parts to which the terminal device needs to be handed over; and/or a value of bandwidth between a subband corresponding to the first bit with the first bit value in the first information subfield and a subband corresponding to the last bit with the first bit value in the first information subfield indicates a bandwidth value of one of the active bandwidth parts to which the terminal device needs to be handed over; or a location, in the first information subfield, of each bit with the first bit value in the first information subfield indicates frequency domain resource locations of the one or more active bandwidth parts to which the terminal device needs to be handed over and/or bandwidth values of the one or more active bandwidth parts to which the terminal device needs to be handed over.

In one embodiment, the network device may also indicate one or more bandwidth parts that include subbands corresponding to bits whose value is "1" as active bandwidth parts to which the terminal device needs to be handed over.

In one embodiment, each bit with the first bit value in the first information subfield is further used to indicate a subband on which the frequency domain resource of the data channel is located in the one or more active bandwidth parts to which the terminal device needs to be handed over.

In one embodiment, the second information subfield includes a plurality of bits, each of the plurality of bits corresponds to each resource block group RBG in bandwidth including subbands corresponding to bits with the first bit value in the first information subfield, and the resource block group includes at least one consecutive physical resource block.

In one embodiment, when the first information field indicates that the active bandwidth part of the terminal device does not need to be switched, the second information field includes a first information subfield and a second information subfield, the currently accessed active bandwidth part is less than or equal to bandwidth of the terminal device, the bandwidth of the terminal device includes a plurality of consecutive subbands in frequency domain, the bandwidth part includes a plurality of consecutive subbands in frequency domain in the bandwidth of the terminal device, and the subband includes a plurality of consecutive physical resource blocks RBs in frequency domain; the first information subfield is further used to indicate at least one subband on which a frequency domain resource of the data channel is located in the currently accessed active bandwidth part; and the second information subfield is used to indicate a location of the frequency domain resource of the data channel in a physical resource block on the at least one subband.

In one embodiment, the second information subfield is used to indicate one type of resource block group mapping mode in a resource block group mapping mode set, the resource block group mapping mode includes a granularity of the resource block group and a frequency domain resource location of the resource block group on a subband corresponding to each bit with the first bit value in the first information subfield, and the resource block group mapping mode set includes at least one type of resource block group mapping mode.

In one embodiment, the sending module 1220 is further configured to send higher layer signaling to the terminal device, where the higher layer signaling is used to indicate the resource block group mapping mode set.

In one embodiment, when the first information field indicates that the active bandwidth part of the terminal device needs to be switched, the second information field includes a first information subfield and a second information subfield, the first information subfield is used to indicate index numbers of the one or more active bandwidth parts to which the terminal device needs to be handed over in one or more bandwidth parts, the second information subfield is used to indicate a frequency domain resource location of a frequency domain resource of the data channel in the one or more active bandwidth parts to which the terminal device needs to be handed over, and the bandwidth part is less than or equal to bandwidth of the terminal device.

In one embodiment, the sending module 1220 is further configured to send higher layer signaling to the terminal device, where the higher layer signaling is used to indicate a frequency domain resource location and/or a bandwidth value, and an index number of each of the one or more bandwidth parts.

In one embodiment, bandwidth values of the subbands included in the bandwidth of the terminal device are the same.

In one embodiment, the processing module 1210 is further configured to preconfigure a quantity of bits included in the second information field, where the quantity of bits included in the second information field is a fixed value; and the sending module 1220 is further configured to send higher layer signaling or a system message, where the higher layer signaling or the system message is used to indicate the quantity of bits included in the second information field; or the processing module 1210 is further configured to determine a quantity of bits included in the second information field based on a bandwidth value of the bandwidth of the terminal device and a mapping relationship between different system bandwidth values and a quantity of resource blocks included in a resource block group.

In one embodiment, the network device may further determine a size and a location of a radio frequency bandwidth part of the terminal device based on a bandwidth value and a location of an active bandwidth part, and then adjust a bandwidth of the RF, so as to effectively reduce power consumption of the terminal device, balance a system load, and improve spectrum utilization.

Therefore, the network device in this embodiment of this application determines the downlink control information, where the downlink control information includes the first information field and the second information field; and sends the downlink control information to indicate a working frequency domain resource of the terminal device by using the first information field and the second information field, so that the network device and the terminal device can accurately exchange information, thereby improving resource utilization and communication efficiency.

It should be understood that the network device 1200 according to this embodiment of this application may correspond to the network device in the resource allocation method 500 in the embodiment of this application, and the foregoing and other management operations and/or functions of the modules in the network device 1200 are respectively used to implement corresponding operations of the foregoing methods. For brevity, details are not described herein again.

Figure 13:
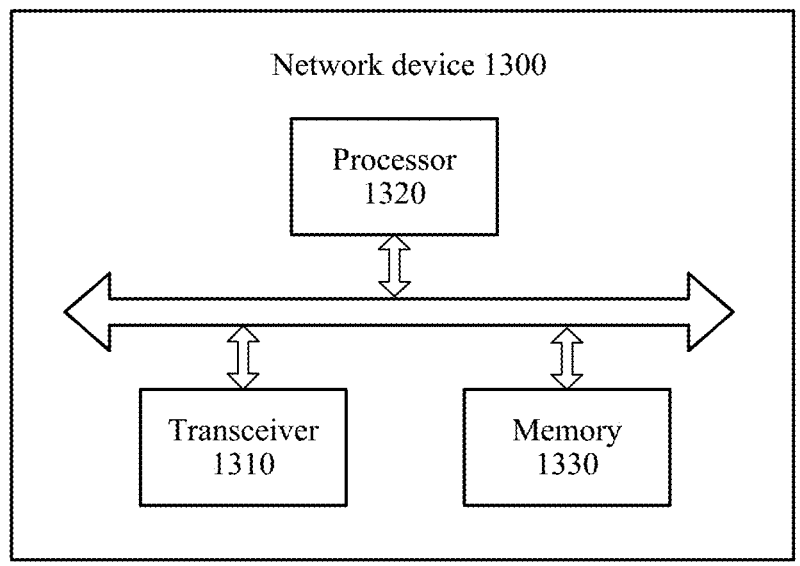
FIG. 13 is a schematic structural diagram of a network device according to an embodiment of this application.

In the embodiments of this application, the sending module 1220 may be implemented by a transceiver, and the processing module 1210 may be implemented by a processor. As shown in FIG. 13, a network device 1300 may include a transceiver 1310, a processor 1320, and a memory 1330. The memory 1330 may be configured to store indication information, and may be further configured to store code, an instruction, and the like executed by the processor 1320.

Figure 14:
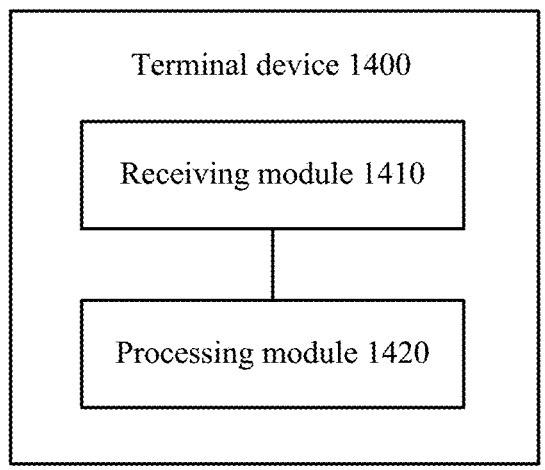
FIG. 14 is a schematic block diagram of a terminal device according to an embodiment of this application.

FIG. 14 is a schematic block diagram of a terminal device 1400 according to an embodiment of this application. As shown in FIG. 14, the terminal device 1400 includes:

a receiving module 1410, configured to receive downlink control information, where the downlink control information includes a first information field and a second information field, and the first information field is used to indicate whether an active bandwidth part of the terminal device needs to be switched; and a processing module 1420, configured to: when the first information field indicates that the active bandwidth part of the terminal device needs to be switched, determine, based on the second information field, one or more active bandwidth parts to which the terminal device needs to be handed over and a frequency domain resource location of a data channel in the one or more active bandwidth parts to which the terminal device needs to be handed over; or the processing module 1420, configured to: when the first information field indicates that the active bandwidth part of the terminal device does not need to be switched, determine, by the terminal device, a frequency domain resource location of a data channel in a currently accessed active bandwidth part based on the second information field.

Therefore, the terminal device in this embodiment of this application receives the downlink control information, where the downlink control information includes the first information field and the second information field, so that the network device and the terminal device can accurately exchange information based on a frequency domain resource location that is indicated by the first information field and the second information field and at which the terminal device works, thereby improving resource utilisation and communication efficiency.

In one embodiment, the first information field includes one bit.

In one embodiment, the second information field includes a first information subfield and a second information subfield, and the processing module 1420 is specifically configured to:

determine, from one or more bandwidth parts based on the first information subfield, the one or more active bandwidth parts to which the terminal device needs to be handed over, where the bandwidth part is less than or equal to bandwidth of the terminal device, the bandwidth of the terminal device includes a plurality of consecutive subbands in frequency domain, the bandwidth part includes a plurality of consecutive subbands in frequency domain in the bandwidth of the terminal device, and the subband includes a plurality of consecutive physical resource blocks RBs in frequency domain;

determine, based on the first information subfield, at least one subband on which a frequency domain resource of the data channel is located in the one or more active bandwidth parts to which the terminal device needs to be handed over; and determine a location of the frequency domain resource of the data channel in a physical resource block on the at least one subband based on the second information subfield.

In one embodiment, the first information subfield includes a plurality of bits, and the processing module 1420 is specifically configured to:

determine, based on a location, in the first information subfield, of each bit with the first bit value in the first information subfield, frequency domain resource locations of the one or more active bandwidth parts to which the terminal device needs to be handed over and/or bandwidth values of the one or more active bandwidth parts to which the terminal device needs to be handed over; and determine, from the one or more bandwidth parts based on the frequency domain resource locations of the one or more active bandwidth parts to which the terminal device needs to be handed over and/or the bandwidth values of the one or more active bandwidth parts to which the terminal device needs to be handed over, the one or more active bandwidth parts to which the terminal device needs to be handed over.

In one embodiment, the receiving module 1410 is further configured to receive higher layer signaling.

The processing module 1420 is further configured to determine, based on the higher layer signaling, a bandwidth value and/or a frequency domain resource location of each of the one or more bandwidth parts that are configured by the network device for the terminal device.

In one embodiment, the first information subfield includes a plurality of bits, and the processing module 1420 is specifically configured to:

determine, based on a location, in the first information subfield, of the first bit with a first bit value in the first information subfield and a location, in the first information subfield, of the last bit with the first bit value in the first information subfield, a frequency domain resource location of one of the active bandwidth parts to which the terminal device needs to be handed over; and/or determine, based on a value of bandwidth between a subband corresponding to the first bit with the first bit value in the first information subfield and a subband corresponding to the last bit with the first bit value in the first information subfield, a bandwidth value of one of the active bandwidth parts to which the terminal device needs to be handed over; or determine, from the one or more bandwidth parts based on the frequency domain resource location of the active bandwidth part to which the terminal device needs to be handed over and/or the bandwidth value of the active bandwidth part to which the terminal device needs to be handed over, the active bandwidth part to which the terminal device needs to be handed over.

In one embodiment, the processing module 1420 is specifically configured to:

determine, based on each bit with the first bit value in the first information subfield, a subband on which the frequency domain resource of the data channel is located in the one or more active bandwidth parts to which the terminal device needs to be handed over.

In one embodiment, the second information subfield includes a plurality of bits, each of the plurality of bits corresponds to each resource block group RBG in bandwidth including subbands corresponding to bits with the first bit value in the first information subfield, the resource block group includes at least one consecutive physical resource block, and the processing module 1420 is specifically configured to:

determine an RBG corresponding to a bit with the first bit value in the second information subfield as a location of a physical resource block of the data channel.

In one embodiment, the second information subfield is used to indicate one type of resource block group mapping mode in a resource block group mapping mode set, the resource block group mapping mode includes a granularity of the resource block group and a frequency domain resource location of the resource block group on a subband corresponding to each bit with the first bit value in the first information subfield, the resource block group mapping mode set includes at least one type of resource block group mapping mode, and the processing module 1420 is specifically configured to:

determine, based on the second information subfield, a mapping manner of a resource block group on the subband corresponding to each bit with the first bit value in the first information subfield; and determine, based on the mapping manner of the resource block group on the subband corresponding to each bit with the first bit value in the first information subfield, the location of the frequency domain resource of the data channel in the physical resource block on the at least one subband.

In one embodiment, the receiving module 1410 is further configured to receive higher layer signaling.

The processing module 1420 is further configured to determine the resource block group mapping mode set based on the higher layer signaling.

In one embodiment, the second information field includes a first information subfield and a second information subfield, the currently accessed active bandwidth part is less than or equal to bandwidth of the terminal device, the bandwidth of the terminal device includes a plurality of consecutive subbands in frequency domain, the bandwidth part includes a plurality of consecutive subbands in frequency domain in the bandwidth of the terminal device, the subband includes a plurality of consecutive physical resource blocks RBs in frequency domain, and the processing module is specifically configured to:

determine, based on the first information subfield, at least one subband on which a frequency domain resource of the data channel is located in the currently accessed active bandwidth part; and determine a location of the frequency domain resource of the data channel in a physical resource block on the at least one subband based on the second information subfield.

In one embodiment, the second information field includes a first information subfield and a second information subfield, the first information field is used to indicate index numbers of the one or more active bandwidth parts to which the terminal device needs to be handed over in one or more bandwidth parts, and the processing module 1420 is specifically configured to:

determine, based on the index numbers of the one or more active bandwidth parts to which the terminal device needs to be handed over, the one or more active bandwidth parts to which the terminal device needs to be handed over in the one or more bandwidth parts, where the bandwidth part is less than or equal to bandwidth of the terminal device; and determine, based on the second information subfield, a frequency domain resource location of a frequency domain resource of the data channel in the one or more active bandwidth parts to which the terminal device needs to be handed over.

In one embodiment, the receiving module 1410 is further configured to receive higher layer signaling.

The processing module 1420 is further configured to determine a frequency domain resource location and/or a bandwidth value, and an index number of each of the one or more bandwidth parts based on the higher layer signaling.

In one embodiment, bandwidth values of the subbands included in the bandwidth of the terminal device are the same.

In one embodiment, the receiving module 1410 is further configured to receive higher layer signaling or a system message.

The processing module 1420 is further configured to determine, based on the higher layer signaling or the system message, a quantity of bits included in the second information field, where the quantity of bits included in the second information field is a fixed value; or the processing module 1420 is further configured to determine a quantity of bits included in the second information field based on a bandwidth value of the bandwidth of the terminal device and a mapping relationship between different system bandwidth values and a quantity of resource blocks included in a resource block group.

Therefore, the terminal device in this embodiment of this application receives the downlink control information, where the downlink control information includes the first information field and the second information field, so that the network device and the terminal device can accurately exchange information based on a frequency domain resource location that is indicated by the first information field and the second information field and at which the terminal device works, thereby improving resource utilisation and communication efficiency.

It should be understood that the terminal device 1400 according to this embodiment of this application may correspond to the terminal device in the resource allocation method 500 in the embodiment of this application, and the foregoing and other management operations and/or functions of the modules in the terminal device 1400 are respectively used to implement corresponding operations of the foregoing methods. For brevity, details are not described herein again.

Figure 15:
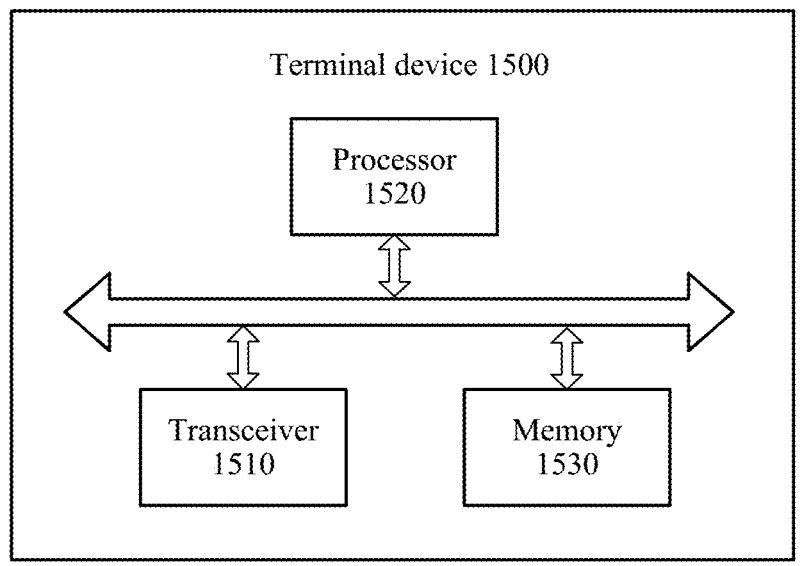
FIG. 15 is a schematic structural diagram of a terminal device according to an embodiment of this application.

In the embodiments of this application, the receiving module 1410 may be implemented by a transceiver, and the processing module 1420 may be implemented by a processor. As shown in FIG. 15, a terminal device 1500 may include a transceiver 1510, a processor 1520, and a memory 1530. The memory 1530 may be configured to store indication information, and may be further configured to store code, an instruction, and the like executed by the processor 1520.

It should be understood that the processor 1320 or the processor 1520 may be an integrated circuit chip, and have a signal processing capability. In an implementation process, operations in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the operations, and logical block diagrams that are disclosed in the embodiments of the present invention. The general-purpose processor may be a microprocessor, or the processor may be any conventional processor or the like. Operations of the methods disclosed with reference to the embodiments of the present invention may be directly executed and accomplished through a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory 1330 or the memory 1530 in the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

It should be noted that the memory of the systems and methods described in this specification includes but is not limited to these and any memory of another proper type.

An embodiment of this application further provides a system chip. The system chip includes an input/output interface, at least one processor, at least one memory, and a bus, the at least one memory is configured to store an instruction, and the at least one processor is configured to invoke the instruction of the at least one memory to perform operations of the methods in the foregoing embodiments.

Figure 16:
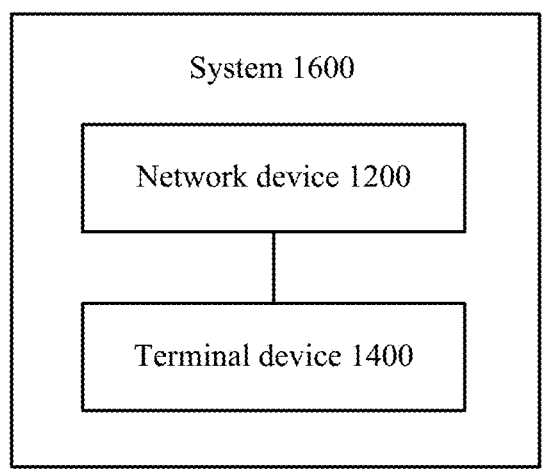
FIG. 16 is a schematic block diagram of a system according to an embodiment of this application.

FIG. 16 shows a resource allocation system 1600 according to an embodiment of this application. The system 1600 includes:

the network device 1200 in the embodiment shown in FIG. 12 and the terminal device 1400 in the embodiment shown in FIG. 14.

An embodiment of this application further provides a computer storage medium, and the computer storage medium may store a program instruction for performing any of the foregoing methods.

In one embodiment, the storage medium may be specifically the memory 1330 or 1530.

Figure 17:
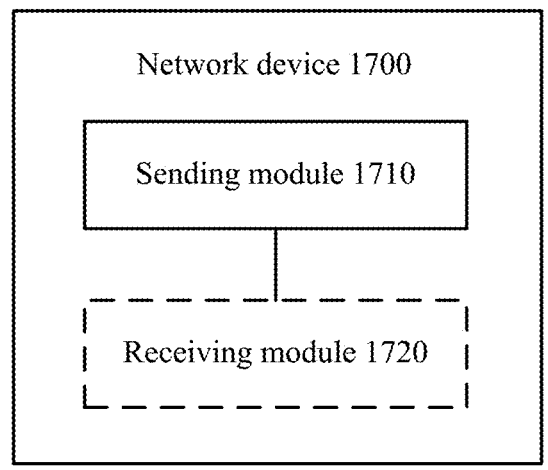
FIG. 17 is a schematic block diagram of a network device according to an embodiment of this application.

FIG. 17 is a schematic block diagram of a network device 1700 according to an embodiment of this application. As shown in FIG. 17, the network device 1700 includes:

a sending module 1710, configured to send first downlink control information, where the first downlink control information includes a first information subfield, and the first information subfield is used to indicate that a terminal device is handed over from a first active bandwidth part to a second active bandwidth part in one or more bandwidth parts.

The sending module 1710 is further configured to send second downlink control information of the second active bandwidth part, where the second downlink control information includes a second information subfield, and the second information subfield is used to indicate a frequency domain resource location of a data channel in the second active bandwidth part.

Therefore, the network device according to this embodiment of this application indicates, by sending the first downlink control information, that the terminal device needs to be handed over from the first active bandwidth part to the second active bandwidth part in the one or more bandwidth parts, and sends the second downlink control information of the second active bandwidth part, where the second downlink control information is used to indicate the frequency domain resource location of the data channel in the second active bandwidth part. In other words, in this embodiment of this application, a frequency domain resource location of a data channel can be indicated in a scenario of switching an active bandwidth part, thereby improving resource utilisation.

In one embodiment, the network device 1700 further includes a receiving module 1720. The receiving module 1720 is configured to receive feedback information, where the feedback information is used to indicate that the terminal device has been handed over from the first active bandwidth part to the second active bandwidth part.

In one embodiment, both the first active bandwidth part and the second active bandwidth part are less than bandwidth of the terminal device. The bandwidth of the terminal device includes a plurality of consecutive subbands in frequency domain. The first active bandwidth part includes a plurality of consecutive subbands in frequency domain in the bandwidth of the terminal device. The second active bandwidth part includes a plurality of consecutive subbands in frequency domain in the bandwidth of the terminal device. The first information subfield is further used to indicate at least one subband on which a frequency domain resource of the data channel is located in the second active bandwidth part. The second information subfield is used to indicate a location of the frequency domain resource of the data channel in a physical resource block on the at least one subband.

In one embodiment, the sending module 1710 is further configured to send higher layer signaling to the terminal device, where the higher layer signaling is used to indicate a bandwidth value and/or a frequency domain resource location of each of the one or more bandwidth parts that are configured by the network device for the terminal device.

In one embodiment, the first information subfield includes a plurality of bits, each of the plurality of bits corresponds to one subband in the bandwidth of the terminal device, and a location, in the first information subfield, of the first bit with a first bit value in the first information subfield and a location, in the first information subfield, of the last bit with the first bit value in the first information subfield are used to indicate a frequency domain resource location of the second active bandwidth part, and/or a value of bandwidth between a subband corresponding to the first bit with the first bit value in the first information subfield and a subband corresponding to the last bit with the first bit value in the first information subfield indicates a bandwidth value of the second active bandwidth part.

In one embodiment, each bit with the first bit value in the first information subfield is further used to indicate a subband on which the frequency domain resource of the data channel is located in the second active bandwidth part.

In one embodiment, the second information subfield includes a plurality of bits, each of the plurality of bits corresponds to each resource block group RBG in bandwidth including subbands corresponding to bits with the first bit value in the first information subfield, and the resource block group includes at least one consecutive physical resource block.

In one embodiment, the second information subfield is used to indicate one type of resource block group mapping mode in a resource block group mapping mode set, the resource block group mapping mode includes a granularity of the resource block group and a frequency domain resource location of the resource block group on a subband corresponding to each bit with the first bit value in the first information subfield, and the resource block group mapping mode set includes at least one type of resource block group mapping mode.

In one embodiment, the sending module 1710 is further configured to send higher layer signaling to the terminal device, where the higher layer signaling is used to indicate the resource block group mapping mode set.

In one embodiment, the first information subfield is used to indicate an index number of the second active bandwidth part.

In one embodiment, the sending module 1710 is further configured to send higher layer signaling to the terminal device, where the higher layer signaling is used to indicate a frequency domain resource location and/or a bandwidth value, and an index number of each of the one or more bandwidth parts.

In one embodiment, bandwidth values of the subbands included in the bandwidth of the terminal device are the same.

Therefore, the network device according to this embodiment of this application indicates, by sending the first downlink control information, that the terminal device needs to be handed over from the first active bandwidth part to the second active bandwidth part in the one or more bandwidth parts, and sends the second downlink control information of the second active bandwidth part, where the second downlink control information is used to indicate the frequency domain resource location of the data channel in the second active bandwidth part. In other words, in this embodiment of this application, a frequency domain resource location of a data channel can be indicated in a scenario of switching an active bandwidth part, thereby improving resource utilisation.

It should be understood that the network device 1700 according to this embodiment of this application may correspond to the network device in the resource allocation method in the embodiment of FIG. 10, and the foregoing and other management operations and/or functions of the modules in the network device 1700 are respectively used to implement corresponding operations of the foregoing methods. For brevity, details are not described herein again.

Figure 18:
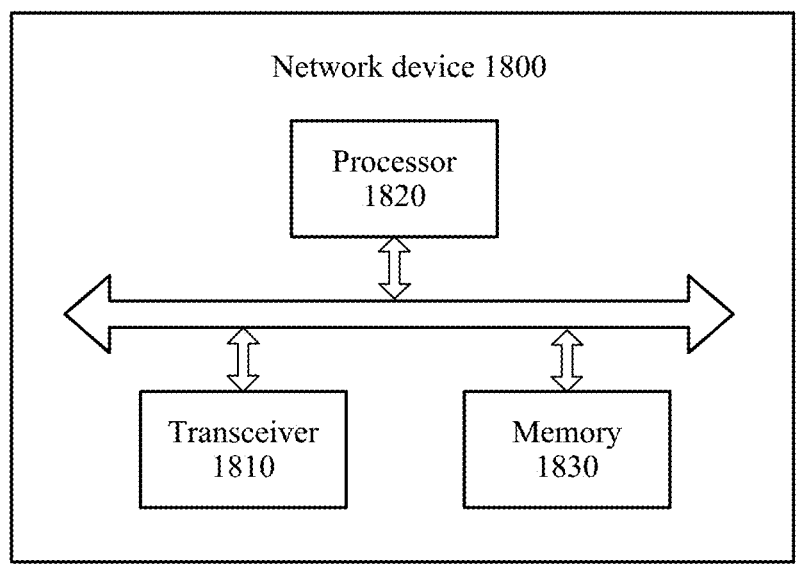
FIG. 18 is a schematic structural diagram of a network device according to an embodiment of this application.

The sending module 1710 and the receiving module 1720 in the embodiments of this application may be implemented by a transceiver. As shown in FIG. 18, a network device 1800 may include a transceiver 1810, a processor 1820, and a memory 1830. The memory 1830 may be configured to store indication information, and may be further configured to store code, an instruction, and the like executed by the processor 1820.

Figure 19:
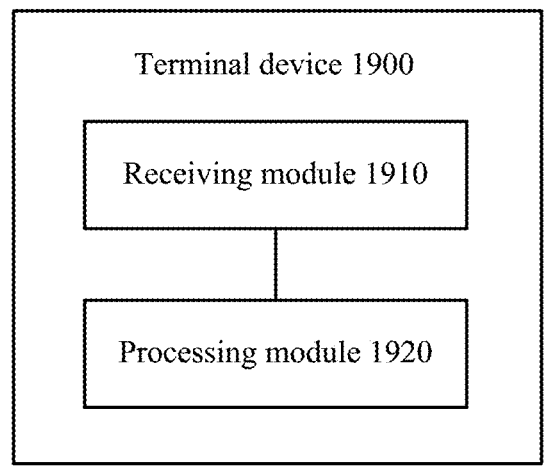
FIG. 19 is a schematic block diagram of a terminal device according to an embodiment of this application.

FIG. 19 is a schematic block diagram of a terminal device 1900 according to an embodiment of this application. As shown in FIG. 19, the terminal device 1900 includes:

a receiving module 1910, configured to receive the first downlink control information, where the first downlink control information includes a first information subfield; and a processing module 1920, configured to determine a second active bandwidth part in one or more bandwidth parts based on the first information subfield.

The processing module 1920 is further configured to be handed over from a first active bandwidth part to the second active bandwidth part.

The receiving module 1910 is further configured to receive second downlink control information in the second active bandwidth part, where the second downlink control information includes a second information subfield.

The processing module 1920 is further configured to determine a frequency domain resource location of a data channel in the second active bandwidth part based on the second information subfield.

Therefore, according to the terminal device in this embodiment of this application, the terminal device receives the first downlink control information. The first downlink control information includes the first information subfield. The terminal device determines the second active bandwidth part in the one or more bandwidth parts based on the first information subfield, is handed from the first active bandwidth part to the second active bandwidth part, and receives the second downlink control information of the second active bandwidth part after being handed over to the second active bandwidth part, where the second downlink control information includes the second information subfield; and determines the frequency domain resource location of the data channel in the second active bandwidth part based on the second information subfield. In other words, in this embodiment of this application, a frequency domain resource location of a data channel can be determined based on an indication of downlink control information in a scenario of switching an active bandwidth part, thereby improving resource utilisation.

In one embodiment, both the first active bandwidth part and the second active bandwidth part are less than bandwidth of the terminal device. The bandwidth of the terminal device includes a plurality of consecutive subbands in frequency domain. The first active bandwidth part includes a plurality of consecutive subbands in frequency domain in the bandwidth of the terminal device. The second active bandwidth part includes a plurality of consecutive subbands in frequency domain in the bandwidth of the terminal device. The processing module 1920 is further configured to determine, based on the first information subfield, at least one subband on which a frequency domain resource of the data channel is located in the second active bandwidth part.

The processing module 1920 is specifically configured to:

determine, by the terminal device, a location of the frequency domain resource of the data channel in a physical resource block on the at least one subband based on the second information subfield.

In one embodiment, the receiving module 1910 is further configured to receive higher layer signaling. The processing module 1920 is further configured to determine, based on the higher layer signaling, a bandwidth value and/or a frequency domain resource location of each of the one or more bandwidth parts that are configured by the network device for the terminal device.

In one embodiment, the first information subfield includes a plurality of bits, each of the plurality of bits corresponds to one subband in the bandwidth of the terminal device, and the processing module 1920 is specifically configured to:

determine a frequency domain resource location of the second active bandwidth part based on a location, in the first information subfield, of the first bit with a first bit value in the first information subfield and a location, in the first information subfield, of the last bit with the first bit value in the first information subfield; and/or determine a bandwidth value of the second active bandwidth part based on a value of bandwidth between a subband corresponding to the first bit with the first bit value in the first information subfield and a subband corresponding to the last bit with the first bit value in the first information subfield; and determine the second active bandwidth part in the one or more bandwidth parts based on the frequency domain resource location of the second active bandwidth part and/or the bandwidth value of the second active bandwidth part.

In one embodiment, the processing module 1920 is specifically configured to:

determine, based on each bit with the first bit value in the first information subfield, a subband on which the frequency domain resource of the data channel is located in the second active bandwidth part.

In one embodiment, the second information subfield includes a plurality of bits, each of the plurality of bits corresponds to each resource block group RBG in bandwidth including subbands corresponding to bits with the first bit value in the first information subfield, the resource block group includes at least one consecutive physical resource block, and the processing module 1920 is specifically configured to:

determine an RBG corresponding to a bit with the first bit value in the second information subfield as a location of a physical resource block of the data channel.

In one embodiment, the second information subfield is used to indicate one type of resource block group mapping mode in a resource block group mapping mode set, the resource block group mapping mode includes a granularity of the resource block group and a frequency domain resource location of the resource block group on a subband corresponding to each bit with the first bit value in the first information subfield, the resource block group mapping mode set includes at least one type of resource block group mapping mode, and the processing module 1920 is specifically configured to:

determine, based on the second information subfield, a mapping manner of a resource block group on the subband corresponding to each bit with the first bit value in the first information subfield; and determine, based on the mapping manner of the resource block group on the subband corresponding to each bit with the first bit value in the first information subfield, the location of the frequency domain resource of the data channel in the physical resource block on the at least one subband.

In one embodiment, the receiving module 1910 is further configured to receive higher layer signaling.

The processing module 1920 is further configured to determine the resource block group mapping mode set based on the higher layer signaling.

In one embodiment, the first information subfield is used to indicate an index number of the second active bandwidth part, and the processing module 1920 is specifically configured to:

determine the second active bandwidth part in the one or more bandwidth parts based on the index number of the second active bandwidth part.

In one embodiment, the receiving module 1910 is further configured to receive higher layer signaling.

The processing module 1920 is further configured to determine a frequency domain resource location and/or a bandwidth value, and an index number of each of the one or more bandwidth parts based on the higher layer signaling.

In one embodiment, bandwidth values of the subbands included in the bandwidth of the terminal device are the same.

Therefore, according to the terminal device in this embodiment of this application, the terminal device receives the first downlink control information. The first downlink control information includes the first information subfield. The terminal device determines the second active bandwidth part in the one or more bandwidth parts based on the first information subfield, is handed from the first active bandwidth part to the second active bandwidth part, and receives the second downlink control information of the second active bandwidth part after being handed over to the second active bandwidth part, where the second downlink control information includes the second information subfield; and determines the frequency domain resource location of the data channel in the second active bandwidth part based on the second information subfield. In other words, in this embodiment of this application, a frequency domain resource location of a data channel can be determined based on an indication of downlink control information in a scenario of switching an active bandwidth part, thereby improving resource utilisation.

It should be understood that the terminal device 1900 according to this embodiment of this application may correspond to the terminal device in the resource allocation method in the embodiment shown in FIG. 10, and the foregoing and other management operations and/or functions of the modules in the terminal device 1900 are respectively used to implement corresponding operations of the foregoing methods. For brevity, details are not described herein again.

Figure 20:
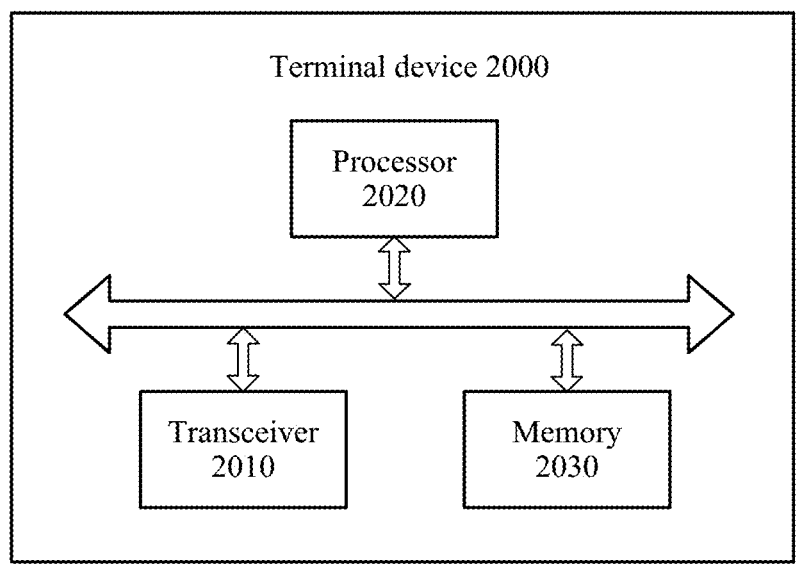
FIG. 20 is a schematic structural diagram of a terminal device according to an embodiment of this application.

In the embodiments of this application, the receiving module 1910 may be implemented by a transceiver, and the processing module 1920 may be implemented by a processor. As shown in FIG. 20, a terminal device 2000 may include a transceiver 2010, a processor 2020, and a memory 2030. The memory 2030 may be configured to store indication information, and may be further configured to store code, an instruction, and the like executed by the processor 2020.

It should be understood that the processor 1820 or the processor 2020 may be an integrated circuit chip, and have a signal processing capability. In an implementation process, operations in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the operations, and logical block diagrams that are disclosed in the embodiments of the present invention. The general-purpose processor may be a microprocessor, or the processor may be any conventional processor or the like. Operations of the methods disclosed with reference to the embodiments of the present invention may be directly executed and accomplished through a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory 1830 or the memory 2030 in the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the systems and methods described in this specification includes but is not limited to these and any memory of another proper type.

Figure 21:
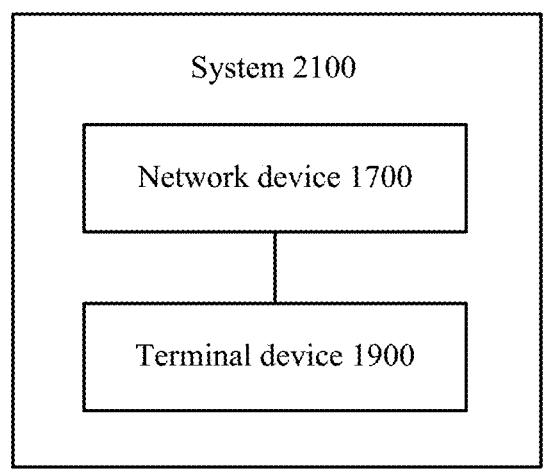
FIG. 21 is a schematic block diagram of a system according to an embodiment of this application.

FIG. 21 shows a resource allocation system 2100 according to an embodiment of this application. The system 2100 includes:

the network device 1700 in the embodiment shown in FIG. 17 and the terminal device 1900 in the embodiment shown in FIG. 19.

An embodiment of this application further provides a computer storage medium, and the computer storage medium may store a program instruction for performing any of the foregoing methods.

In one embodiment, the storage medium may be specifically the memory 1830 or 2030.

An embodiment of this application further provides a chip system. The chip system includes a processor, configured to support a distributed unit, a centralized unit, and a terminal device in implementing a function in the foregoing embodiments, for example, generating or processing data and/or information in the foregoing methods. In a possible design, the chip system further includes a memory. The memory is configured to store a necessary program instruction and necessary data in the distributed unit, the centralized unit, and the terminal device. The chip system may include a chip, or may include a chip and another discrete device. It should be understood that data and/or information processed by the chip may be received from a base station, and processed data and/or information may also be sent to the base station.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource allocation method, comprising:
receiving, by a terminal device, downlink control information, wherein the downlink control information comprises a first information field and a second information field, and the first information field is used to indicate to the terminal device whether to switch a first active bandwidth part of the terminal device;
determining, by the terminal device based on the second information field, one or more second active bandwidth parts and a frequency domain resource of a data channel in the one or more second active bandwidth parts to which the terminal device switches, in response to the first information field indicating to the terminal device to switch the first active bandwidth part; and
determining, by the terminal device, a frequency domain resource of a data channel in the first active bandwidth part based on the second information field, in response to the first information field indicating to the terminal device not to switch the first active bandwidth part.

2. The method according to claim 1, wherein the second information field comprises a first information subfield and a second information subfield, and wherein determining, by the terminal device based on the second information field, one or more second active bandwidth parts and a frequency domain resource of a data channel in the one or more second active bandwidth parts to which the terminal device switches comprises:
determining, by the terminal device from one or more available bandwidth parts based on the first information subfield, the one or more second active bandwidth parts to switch, wherein the one or more available bandwidth parts are less than or equal to a bandwidth of the terminal device, wherein the bandwidth of the terminal device includes a plurality of consecutive subbands in a frequency domain, wherein the one or more available bandwidth parts include a plurality of consecutive subbands in the frequency domain in the bandwidth of the terminal device, and wherein each of the consecutive subbands includes a plurality of consecutive physical resource blocks (RBs) in the frequency domain;

determining, by the terminal device based on the first information subfield, at least one subband on which the frequency domain resource of the data channel is located in the one or more second active bandwidth parts; and determining, by the terminal device, a location of the frequency domain resource of the data channel in one or more of the RBs on the at least one subband based on the second information subfield.

3. The method according to claim 2, wherein before receiving, by the terminal device, the downlink control information, the method further comprises:

receiving, by the terminal device, higher layer signaling; and determining, by the terminal device based on the higher layer signaling, one or more of a bandwidth value and a frequency domain resource location of each of the one or more available bandwidth parts for the terminal device.

4. The method according to claim 2, wherein the first information subfield comprises a plurality of bits, each of the plurality of bits corresponds to one of the consecutive subbands in the bandwidth of the terminal device, and wherein determining, by the terminal device from one or more available bandwidth parts based on the first information subfield, the one or more second active bandwidth parts to switch comprises:

determining, by the terminal device based on a location of a first bit with a first bit value in the first information subfield and a location of a last bit with the first bit value in the first information subfield, a frequency domain resource location of one of the second active bandwidth parts; and determining, by the terminal device based on a value of a bandwidth between a subband corresponding to the first bit with the first bit value in the first information subfield and a subband corresponding to the last bit with the first bit value in the first information subfield, a bandwidth value of one of the second active bandwidth parts.

5. The method according to claim 2, wherein determining, by the terminal device based on the first information subfield, at least one subband on which the frequency domain resource of the data channel is located in the one or more second active bandwidth parts comprises:

determining, by the terminal device based on each bit with a first bit value in the first information subfield, the at least one subband on which the frequency domain resource of the data channel is located in the one or more second active bandwidth parts.

6. The method according to claim 2, wherein the second information subfield comprises a plurality of bits, each of the plurality of bits corresponds to one resource block group (RBG) in the at least one subband corresponding to each bit with a first bit value in the first information subfield, wherein the RBG comprises at least one consecutive physical resource block of the RBs, and wherein determining, by the terminal device, a location of the frequency domain resource of the data channel in the RBs on the at least one subband based on the second information subfield comprises:

determining, by the terminal device, an RBG corresponding to a bit with a first bit value in the second information subfield as a location of the RBs corresponding to the frequency domain resource of the data channel.

7. The method according to claim 2, wherein the second information subfield is used to indicate one type of resource block group (RBG) mapping modes in a RBG mapping mode set, the RBG mapping mode comprises a granularity of the RBG and a frequency domain resource location of the RBG on the at least one subband corresponding to each bit with a first bit value in the first information subfield, wherein the RBG comprises at least one consecutive physical resource block of the RBs, and wherein determining, by the terminal device, a location of the frequency domain resource of the data channel in the RBs on the at least one subband based on the second information subfield comprises:

determining, by the terminal device based on the second information subfield, a mapping manner of the RBG on the at least one subband corresponding to each bit with the first bit value in the first information subfield; and determining, by the terminal device based on the mapping manner of the RBG on the at least one subband corresponding to each bit with the first bit value in the first information subfield, the location of the RBs corresponding to the frequency domain resource of the data channel on the at least one subband.

8. The method according to claim 7, wherein before the receiving, by the terminal device, the downlink control information, the method further comprises:

receiving, by the terminal device, higher layer signaling; and determining, by the terminal device, the RBG mapping mode set based on the higher layer signaling.

9. The method according to claim 1, wherein the second information field comprises a first information subfield and a second information subfield, wherein the first active bandwidth part is less than or equal to a bandwidth of the terminal device, wherein the bandwidth of the terminal device includes a plurality of consecutive subbands in a frequency domain, wherein the first active bandwidth part includes a plurality of consecutive subbands in the frequency domain in the bandwidth of the terminal device, wherein each of the consecutive subbands includes a plurality of consecutive physical resource blocks (RBs) in the frequency domain, and wherein determining, by the terminal device, a frequency domain resource of a data channel in the first active bandwidth part based on the second information field comprises:

determining, by the terminal device based on the first information subfield, at least one subband on which the frequency domain resource of the data channel is located in the first active bandwidth part; and determining, by the terminal device, a location of the frequency domain resource of the data channel in one or more of the RBs on the at least one subband based on the second information subfield.

10. The method according to claim 1, wherein the second information field comprises a first information subfield and a second information subfield, wherein the first information subfield is used to indicate index numbers of the one or more second active bandwidth parts, and wherein determining, by the terminal device based on the second information field, one or more second active bandwidth parts and a frequency domain resource of a data channel in the one or more second active bandwidth parts to which the terminal device switches comprises:

determining, by the terminal device based on the index numbers of the one or more second active bandwidth parts, the one or more second active bandwidth parts to switch, wherein the one or more second active bandwidth part are less than or equal to a bandwidth of the terminal device; and determining, by the terminal device based on the second information subfield, a location of the frequency domain resource of the data channel in the one or more second active bandwidth parts.

11. A terminal device, comprising:

a receiving module, configured to receive downlink control information, wherein the downlink control information comprises a first information field and a second information field, and the first information field is used to indicate to the terminal device whether to switch a first active bandwidth part of the terminal device;

a processing module, configured to:

determine, based on the second information field, one or more second active bandwidth parts and a frequency domain resource of a data channel in the one or more second active bandwidth parts to which the terminal device switches, in response to the first information field indicating to the terminal device to switch the first active bandwidth part; and determine a frequency domain resource of a data channel in the first active bandwidth part based on the second information field, in response to the first information field indicating to the terminal device not to switch the first active bandwidth part.

12. The terminal device according to claim 11, wherein the second information field comprises a first information subfield and a second information subfield, and when the processing module is configured to determine, based on the second information field, one or more second active bandwidth parts and a frequency domain resource of a data channel in the one or more second active bandwidth parts to which the terminal device switches, the processing module is further configured to:

determine, from one or more available bandwidth parts based on the first information subfield, the one or more second active bandwidth parts to switch, wherein the one or more available bandwidth parts are less than or equal to a bandwidth of the terminal device, wherein the bandwidth of the terminal device includes a plurality of consecutive subbands in a frequency domain, wherein the one or more available bandwidth parts include a plurality of consecutive subbands in the frequency domain in the bandwidth of the terminal device, and wherein each of the consecutive subbands includes a plurality of consecutive physical resource blocks (RB s) in the frequency domain;

determine, based on the first information subfield, at least one subband on which the frequency domain resource of the data channel is located in the one or more second active bandwidth parts; and determine a location of the frequency domain resource of the data channel in one or more of the RBs on the at least one subband based on the second information subfield.

13. The terminal device according to claim 12, wherein the receiving module is further configured to receive higher layer signaling; and the processing module is further configured to determine, based on the higher layer signaling, one or more of a bandwidth value and a frequency domain resource location of each of the one or more available bandwidth parts for the terminal device.

14. The terminal device according to claim 12, wherein the first information subfield comprises a plurality of bits, each of the plurality of bits corresponds to one of the consecutive subbands in the bandwidth of the terminal device, and when the processing module is configured to determine, from one or more available bandwidth parts based on the first information subfield, the one or more second active bandwidth parts to switch, the processing module is further configured to:

determine, based on a location of a first bit with a first bit value in the first information subfield and a location of a last bit with the first bit value in the first information subfield, a frequency domain resource location of one of the second active bandwidth parts; and determine, based on a value of a bandwidth between a subband corresponding to the first bit with the first bit value in the first information subfield and a subband corresponding to the last bit with the first bit value in the first information subfield, a bandwidth value of one of the second active bandwidth parts.

15. The terminal device according to claim 12, wherein when the processing module is configured to determine, based on the first information subfield, at least one subband on which the frequency domain resource of the data channel is located in the one or more second active bandwidth parts, the processing module is further configured to:

determine, based on each bit with a first bit value in the first information subfield, the at least one subband on which the frequency domain resource of the data channel is located in the one or more second active bandwidth parts.

16. The terminal device according to claim 12, wherein the second information subfield comprises a plurality of bits, each of the plurality of bits corresponds to one resource block group (RBG) in the at least one subband corresponding to each bit with a first bit value in the first information subfield, wherein the RBG comprises at least one consecutive physical resource block of the RBs, and wherein when the processing module is configured to determine a location of the frequency domain resource of the data channel in the RBs on the at least one subband based on the second information subfield, the processing module is further configured to:

determine an RBG corresponding to a bit with a first bit value in the second information subfield as a location of the RBs corresponding to the frequency domain resource of the data channel.

17. The terminal device according to claim 12, wherein the second information subfield is used to indicate one type of resource block group (RBG) mapping modes in a RBG mapping mode set, the RBG mapping mode comprises a granularity of the RBG and a frequency domain resource location of the RBG on the at least one subband corresponding to each bit with a first bit value in the first information subfield, wherein the RBG comprises at least one consecutive physical resource block of the RBs, and wherein when the processing module is configured to determine a location of the frequency domain resource of the data channel in the RBs on the at least one subband based on the second information subfield, the processing module is further configured to:

determine, based on the second information subfield, a mapping manner of the RBG on the at least one subband corresponding to each bit with the first bit value in the first information subfield; and determine, based on the mapping manner of the RBG on the at least one subband corresponding to each bit with the first bit value in the first information subfield, the location of the RBs corresponding to the frequency domain resource of the data channel on the at least one subband.

18. The terminal device according to claim 17, wherein the receiving module is further configured to receive higher layer signaling; and the processing module is further configured to determine the RBG mapping mode set based on the higher layer signaling.

19. The terminal device according to claim 11, wherein the second information field comprises a first information subfield and a second information subfield, wherein the first active bandwidth part is less than or equal to a bandwidth of the terminal device, wherein the bandwidth of the terminal device includes a plurality of consecutive subbands in a frequency domain, wherein the first active bandwidth part includes a plurality of consecutive subbands in the frequency domain in the bandwidth of the terminal device, wherein each of the consecutive subbands includes a plurality of consecutive physical resource blocks (RBs) in the frequency domain, and wherein when the processing module is configured to determine a frequency domain resource of a data channel in the first active bandwidth part based on the second information field, the processing module is further configured to:

determine, based on the first information subfield, at least one subband on which the frequency domain resource of the data channel is located in the first active bandwidth part; and determine a location of the frequency domain resource of the data channel in one or more of the RBs on the at least one subband based on the second information subfield.

20. The terminal device according to claim 11, wherein the second information field comprises a first information subfield and a second information subfield, wherein the first information subfield is used to indicate index numbers of the one or more second active bandwidth parts, and wherein when the processing module is configured to determine, based on the second information field, one or more second active bandwidth parts and a frequency domain resource of a data channel in the one or more second active bandwidth parts to which the terminal device switches, the processing module is further configured to:

determine, based on the index numbers of the one or more second active bandwidth parts, the one or more second active bandwidth parts to switch, wherein the one or more second active bandwidth parts are less than or equal to a bandwidth of the terminal device; and determine, based on the second information subfield, a location of the frequency domain resource of the data channel in the one or more second active bandwidth parts.

* * * * *